(12) United States Patent
Faxér et al.

(10) Patent No.: US 10,972,162 B2
(45) Date of Patent: Apr. 6, 2021

(54) ENHANCED BEAM-BASED CODEBOOK SUBSET RESTRICTION SIGNALING

(71) Applicant: Telefonaktiebolaget LM Ericsson (publ), Stockholm (SE)

(72) Inventors: Sebastian Faxér, Järfälla (SE); Shiwei Gao, Nepean (CA); Robert Mark Harrison, Grapevine, TX (US); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/789,759

(22) Filed: Feb. 13, 2020

(65) Prior Publication Data

US 2020/0186214 A1    Jun. 11, 2020

Related U.S. Application Data

(63) Continuation of application No. 16/518,462, filed on Jul. 22, 2019, now Pat. No. 10,608,715, which is a
(Continued)

(51) Int. Cl.
*H04B 7/0456* (2017.01)
*H04L 1/16* (2006.01)
(Continued)

(52) U.S. Cl.
CPC ......... *H04B 7/0478* (2013.01); *H04B 7/0469* (2013.01); *H04B 7/0473* (2013.01);
(Continued)

(58) Field of Classification Search
CPC .. H04B 7/0478; H04B 7/0469; H04B 7/0639; H04B 7/0658; H04B 7/0473;
(Continued)

(56) References Cited

U.S. PATENT DOCUMENTS 9,350,435 B2   5/2016   Zhang et al.
10,193,600 B2  1/2019   Faxér et al.
(Continued)

FOREIGN PATENT DOCUMENTS

JP   2012518941 A   8/2012
RU   2433550 C2    11/2011
(Continued)

OTHER PUBLICATIONS

Huawei et al., "Codebook Design for rank 3 to 8 for 2D antenna arrays", 3GPP TSG RAN WG1 Meeting #83, Anaheim, USA, Nov. 15, 2015, pp. 1-12, R1-157490, 3GPP.
(Continued)

*Primary Examiner* — Melvin C Marcelo
(74) *Attorney, Agent, or Firm* — Coats & Bennett, PLLC

(57) ABSTRACT

Example embodiments are presented for codebook subset restriction and precoder selection in wireless communications systems. For instance, an example method for codebook subset restriction at a user equipment (UE) is presented. In the example method, the UE can receive, from a network node such as a gNB, codebook subset restriction (CBSR) signaling for a first component common to precoders in a first group of codebooks. In an aspect of the present disclosure, a restriction of the first component maps to a restriction of a second component and the second component is common to precoders in a second group of codebooks. In addition, the example method includes restricting precoders selectable from a codebook in the second group of codebooks based on the second component. Network-side methods are presented, as well as example UEs and network nodes.

25 Claims, 16 Drawing Sheets

Related U.S. Application Data continuation of application No. 16/235,273, filed on Dec. 28, 2018, now Pat. No. 10,411,773, which is a continuation of application No. PCT/SE2018/050794, filed on Aug. 6, 2018.

(60) Provisional application No. 62/544,761, filed on Aug. 11, 2017.

(51) Int. Cl.
  *H04B 7/06* (2006.01)
  *H04L 5/00* (2006.01)

(52) U.S. Cl.
  CPC ......... *H04B 7/0486* (2013.01); *H04B 7/0626* (2013.01); *H04B 7/0639* (2013.01); *H04B 7/0658* (2013.01); *H04L 1/1614* (2013.01); *H04L 5/0048* (2013.01)

(58) Field of Classification Search
  CPC ... H04B 7/0486; H04B 7/0626; H04L 1/1614; H04L 5/0048
  See application file for complete search history.

(56) References Cited

U.S. PATENT DOCUMENTS

| | | | |
|---|---|---|---|
| 10,411,773 B2* | 9/2019 | Faxer | H04B 7/0478 |
| 10,608,715 B2* | 3/2020 | Faxer | H04B 7/0639 |
| 2010/0215112 A1 | 8/2010 | Tsai et al. | |
| 2010/0223237 A1 | 9/2010 | Mishra et al. | |
| 2011/0170638 A1 | 7/2011 | Yuan et al. | |
| 2011/0243098 A1 | 10/2011 | Koivisto et al. | |
| 2011/0249713 A1 | 10/2011 | Hammarwall et al. | |
| 2012/0020434 A1 | 1/2012 | Callard et al. | |
| 2013/0077660 A1 | 3/2013 | Ko et al. | |
| 2013/0163687 A1 | 6/2013 | Jing et al. | |
| 2013/0229980 A1 | 9/2013 | Wernersson et al. | |
| 2014/0016549 A1 | 1/2014 | Novlan et al. | |
| 2014/0198751 A1 | 7/2014 | Prasad et al. | |
| 2014/0198868 A1 | 7/2014 | Yang et al. | |
| 2014/0205031 A1 | 7/2014 | Nammi | |
| 2014/0254508 A1 | 9/2014 | Kishnamurthy et al. | |
| 2014/0269577 A1 | 9/2014 | Hammarwall | |
| 2016/0233939 A9 | 8/2016 | Hammarwall et al. | |
| 2016/0248492 A1 | 8/2016 | Prasad et al. | |
| 2016/0277090 A1 | 9/2016 | Kim et al. | |
| 2016/0294454 A1 | 10/2016 | Onggosanusi et al. | |
| 2016/0323022 A1 | 11/2016 | Rahman et al. | |

FOREIGN PATENT DOCUMENTS

| | | |
|---|---|---|
| RU | 2011140068 A | 4/2013 |
| WO | 2014052806 A1 | 4/2014 |
| WO | 2014176813 A1 | 11/2014 |
| WO | 2016114708 A2 | 7/2016 |

OTHER PUBLICATIONS

Ericsson, "Codebook Subset Restriction", 3GPP TSG RAN WG1 Meeting 90bis, Prague, CZ, Oct. 9, 2017, pp. 1-6, R1-1718736, 3GPP.

Samsung, "On codebook subset restriction", 3GPP TSG RAN WG1 Meeting #90bis, Prague, P. R. Czechia, Oct. 9, 2017, pp. 1-2, R1-1717617, 3GPP.

Thomas, M. et al., "Elements of Information Theory", Chapter 3, Asymptotic Equipartition Property', Jan. 1, 2006, pp. 57-62, Second edition, John Wiley & Sons, Inc.

Alameldeen, A. et al., "Frequent Pattern Compression: A Significance-Based Compression Scheme for L2 Caches", Technical Report #1500, May 1, 2004, pp. 1-15, University of Wisconsin, US.

Ericsson, "On Codebook Subset Restriction", 3GPP TSG-RAN WG1 #90, Prague, Czech Republic, Aug. 21, 2017, pp. 1-5, R1-1714283, 3GPP.

Ericsson, "Codebook design for Type I single-panel CSI feedback", 3GPP TSG-RAN WG1 #89, Hangzhou, China, May 15, 2017, pp. 1-20, R1-1708687, 3GPP.

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.0.0, Dec. 1, 2013, pp. 1-186, 3GPP, France.

Ericsson, "Remaining Details of Codebook Subset Restriction", 3GPP TSG-RAN WG1#83, Anaheim, USA, Nov. 15, 2015, pp. 1-4, R1-157203, 3GPP.

AT&T et al., "WF on class a and class B CSI reporting for Rel.13 EB/FD-MIMO", 3GPP TSG RAN WG1 Meeting #82bis, Malmö, Sweden, Oct. 5, 2015, pp. 1-10, R1-156165, 3GPP.

* cited by examiner

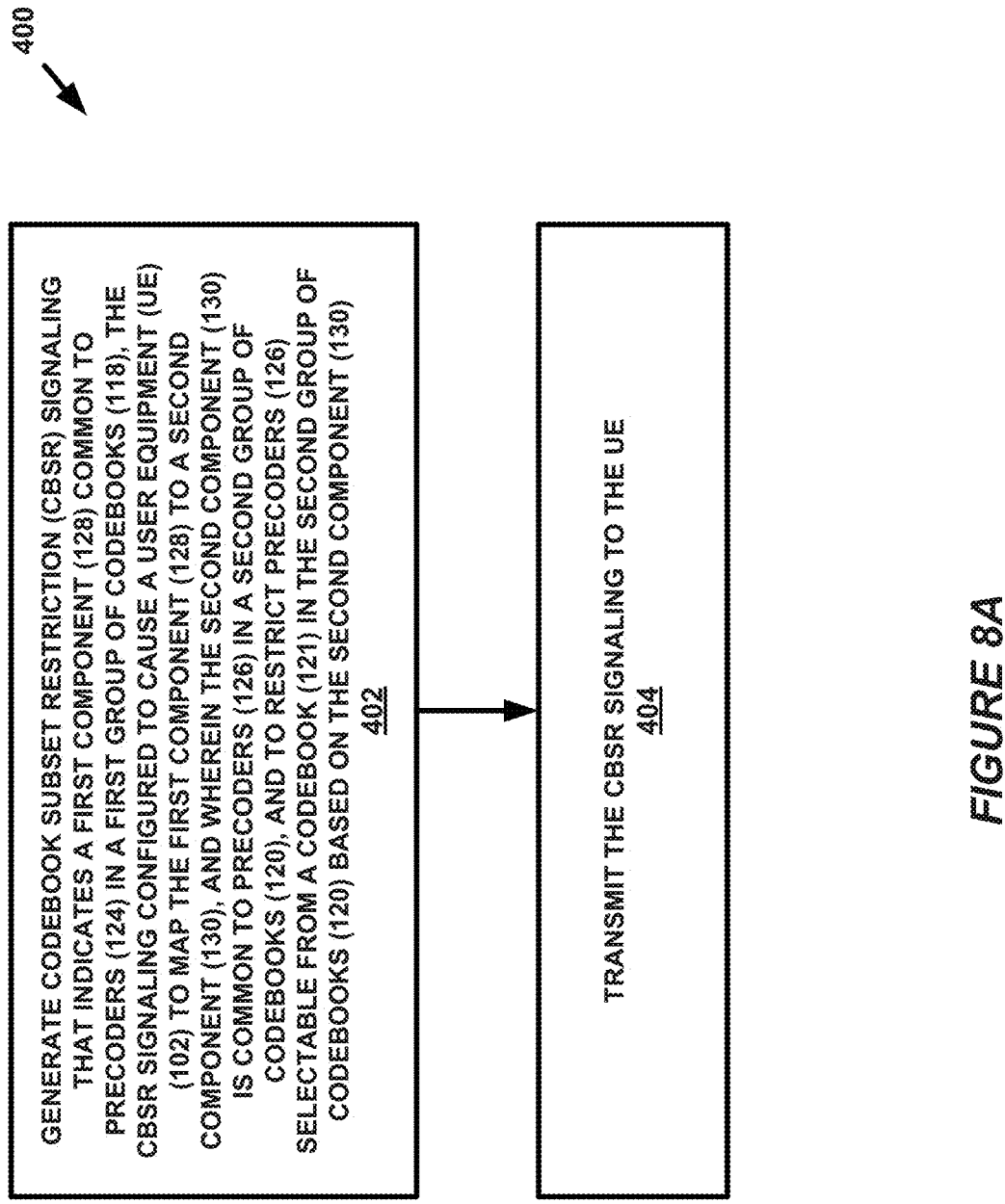

ENHANCED BEAM-BASED CODEBOOK SUBSET RESTRICTION SIGNALING

CROSS-REFERENCE TO PRIORITY APPLICATION

The present application is a Continuation of application Ser. No. 16/518,462 filed on 22 Jul. 2019, which is Continuation of application Ser. No. 16/235,273 filed on 28 Dec. 2018, now U.S. patent Ser. No. 10/411,773, which is a Continuation of the International Application No. PCT/SE2018/050794 filed on 6 Aug. 2018, which in its turn claims priority to U.S. Provisional Application No. 62/544,761 filed on 11 Aug. 2017. The disclosures of each of these references are incorporated in their entireties by reference herein.

TECHNICAL FIELD

The application relates to systems, methods, and apparatus for wireless communication, and in particular, for enhanced codebook subset restriction (CBSR) signaling.

BACKGROUND

Fifth-Generation (5G) air-interface protocols, also referred to as New Radio (NR), are currently being developed by the Third Generation Partnership Project (3GPP). The beam-based rank-agnostic CBSR approach used in Long Term Evolution (LTE) cannot be directly re-used for NR as the same beam-based quantity is not a constituent component of the precoders for all ranks. Namely, the precoder codebooks for ranks 3 and 4 in LTE are constructed with a different beam-based quantity than the remaining ranks. An alternative is to use the pre-LTE full dimension multiple-input, multiple-output (FD-MIMO) CBSR approach based on precoding matrix indicator (PMI)-based per-rank CBSR, however this would lead to around 8 times more signaling overhead compared to LTE.

NR codebooks use a generalized co-phasing behavior that is different from prior art codebooks in LTE, as there are now two parameters ($\varphi\_n$ and $\theta\_p$) used to co-phase the two-dimensional discrete Fourier transform (2D DFT) beams. The co-phasing behavior depends on the number of Channel State Information Reference Signal (CSI-RS) ports used in the codebook and may be different for codebooks of different ranks. Consequently, new mechanisms are needed in NR for codebook restriction of co-phasing and rank.

SUMMARY

The present disclosure describes techniques for codebook subset restriction and precoder selection in wireless telecommunications systems. Generally, the techniques involve a first component common to precoders of a first group of codebooks mapping to a second component different from the first component and common to precoders of a second group of codebooks. For instance, the present disclosure presents in an example method for codebook subset restriction at a user equipment (UE). According to the method, the UE can receive, from a network node (e.g., gNB, eNB, etc.), codebook subset restriction CBSR signaling for a first component common to precoders in a first group of codebooks. In an aspect of this example method, a restriction of the first component maps to a restriction of a second component common to precoders in a second group of codebooks. Several other example embodiments performed by the UE are also included herein will be described further below.

The present disclosure also discloses a method performed by a network node for codebook subset restriction that includes generating CBSR signaling that indicates a first component common to precoders in a first group of codebooks. In an aspect, the first component maps to a second component common to precoders in a second group of codebooks. Additionally, the CBSR signaling can be configured to cause a UE to restrict precoders selectable from a codebook in the second group of codebooks based on the second component. In a further aspect of the example method, the network node can transmit the CBSR signaling to the UE.

Embodiments herein also include corresponding apparatus, computer programs, and carriers (e.g., computer program products), as well as network-side aspects performed by a network node.

BRIEF DESCRIPTION OF THE DRAWINGS

FIG. 8A illustrates a method performed by a network node according to one or more embodiments.

DETAILED DESCRIPTION

The present disclosure describes example techniques for codebook subset restriction and precoder selection. For instance, in some examples, a UE can receive, from a network node, CBSR signaling that indicates a first component (or components) common to precoders in a first group of codebooks. The UE can map the first component to a second component that is different than the first component and that is common to precoders in a second group of codebooks, and can restrict precoders selectable from a codebook in the second group of codebooks based on the second component.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The NR standard is currently being specified. A core aspect of NR is the support of MIMO antenna deployments and MIMO related techniques. NR will support an 8-layer spatial multiplexing mode for up to 32 TX antenna ports with channel dependent precoding. The spatial multiplexing mode aims for high data rates in favorable channel conditions.

Figure 1:
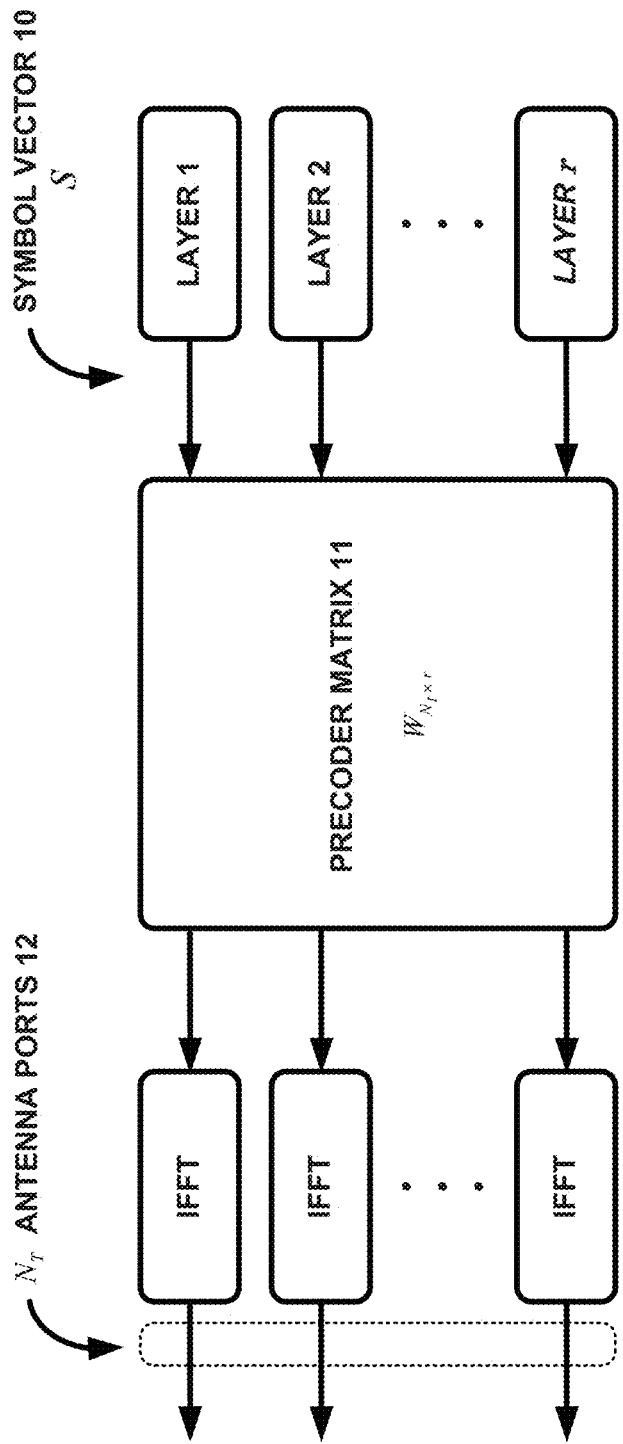
FIG. 1 illustrates a spatial multiplexing operation that underlies example embodiments of the present disclosure.

An illustration of the spatial multiplexing operation is provided in FIG. 1. As shown in the figure, an information carrying symbol vectors 10 is multiplied by an NT×r precoder matrix W 11, which serves to distribute the transmit energy in a subspace of the NT (corresponding to NT antenna ports 12)-dimensional vector space. The precoder matrix 11 is typically selected from a codebook of possible precoder matrices, and typically indicated by means of a precoder matrix indicator (PMI), which specifies a unique precoder matrix in the codebook for a given number of symbol streams. The r symbols in symbol vector s 10 each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

NR uses OFDM in the downlink and hence the received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the interlayer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2$$

where:
$\hat{H}_n$ is a channel estimate;
$W_k$ is a hypothesized precoder matrix with index k; and
$\hat{H}_n W_k$ is the hypothesized equivalent channel.

In closed-loop precoding for the NR downlink, the UE transmits (based on channel measurements in the forward link/downlink) recommendations to the gNB (also referred to herein as a gNB, eNB, base station, or the like) regarding a suitable precoder to use. For example, by transmitting or sending a PMI to the gNB. The gNB may configure the UE to provide feedback, and may transmit CSI-RS and/or may configure the UE to use measurements of CSI-RS to feedback recommended precoding matrices that the UE selects from a codebook. A single precoder or indication thereof that is supposed to cover a large bandwidth (wideband precoding) may be fed back. It may also be beneficial to match the frequency variations of the channel and instead feedback a frequency-selective precoding report, e.g. several precoders or indications thereof, one per subband. This is an example of the more general case of CSI feedback, which also encompasses feeding back other information than recommended precoders to assist the gNB in subsequent transmissions to the UE. Such other information may include channel quality indicators (CQIs) as well as transmission rank indicator (RI).

Given the CSI feedback from the UE, the gNB determines the transmission parameters it wishes to use to transmit to the UE, including the precoding matrix or precoder, transmission rank, and modulation and coding state (MCS). These transmission parameters may differ from the recommendations the UE makes. Therefore, a rank indicator and MCS may be signaled in downlink control information (DCI), and the precoding matrix or precoder or indication thereof can be signaled in DCI or the gNB can transmit a demodulation reference signal from which the equivalent channel can be measured. The transmission rank, and thus the number of spatially multiplexed layers, is reflected in the number of columns of the precoder W. For efficient performance, it is important that a transmission rank that matches the channel properties is selected.

Figure 2:
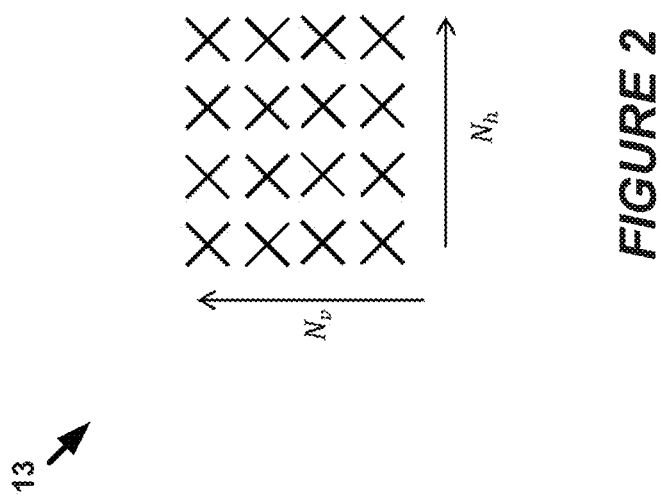
FIG. 2 illustrates an example array with cross-polarized antenna elements utilized in example embodiments of the present disclosure.

The example embodiments presented in this disclosure may be used with two-dimensional antenna arrays and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N = N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port. FIG. 2 illustrates a two-dimensional (4×4) array 13 with cross-polarized antenna elements having $N_h = 4$ horizontal antenna elements and $N_v = 4$ vertical antenna elements.

Precoding may be interpreted as multiplying the signal with different beamforming weights for each antenna prior to transmission. A typical approach is to tailor the precoder to the antenna form factor, i.e. taking into account $N_h$, $N_v$, and $N_p$ when designing the precoder codebook.

A common type of precoding is to use a DFT-precoder, where the precoder vector used to precode a single-layer transmission using a single-polarized uniform linear array (ULA) with N antennas is defined as:

$$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix},$$

where $k=0, 1, \ldots QN-1$ is the precoder index and Q is an integer oversampling factor. A corresponding precoder vector for a two-dimensional uniform planar array (UPA) can be created by taking the Kronecker product of two precoder vectors as $w_{2D}(k,l)=w_{1D}(k) \otimes w_{1D}(l)$. Extending the precoder for a dual-polarized UPA may then be done as:

$$w_{2D,DP}(k, l, \phi)$$
$$= \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix}$$

where $e^{j\phi}$ is a co-phasing factor that may for instance be selected from QPSK alphabet $$\phi \in \left\{ 0, \frac{\pi}{2}, \pi, \frac{3\pi}{2} \right\}.$$

A precoder matrix $W_{2D,DP}$ for multi-layer transmission may be created by appending columns of DFT precoder vectors as:

$$W_{2D,DP}=[w_{2D,DP}(k_1,l_1,\phi_1)w_{2D,DP}(k_2,l_2,\phi_2) \ldots w_{2D,DP}(k_R,l_R,\phi_R)],$$

where R is the number of transmission layers, i.e. the transmission rank. In a common special case for a rank-2 DFT precoder, $k_1=k_2=k$ and $l_1=l_2=l$, meaning that:

$$W_{2D,DP} =$$
$$[w_{2D,DP}(k, l, \phi_1) \; w_{2D,DP}(k, l, \phi_2)] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}$$

Figure 3:
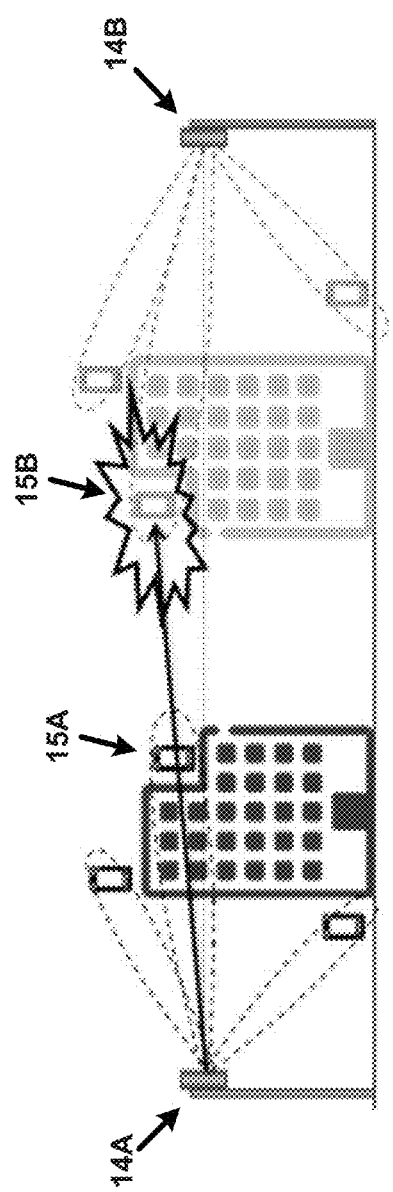
FIG. 3 illustrates an example scenario where dynamic elevation beamforming may cause interference.

Elevation beamforming, which can be achieved by using codebook-based precoding from a 2D or vertical antenna array, is a powerful tool for directing the transmitted energy towards the UE of interest, thereby increasing the received signal level. Interference is another aspect that should be taken into consideration to maximize system performance. For instance, in some urban topologies, dynamic elevation beamforming can cause significant interference, as illustrated in FIG. 3. As show, when a gNB 14 directs its transmitted power towards a UE 15A it may at the same time also direct the transmitted energy towards another UE 15B currently receiving a signal from another gNB 18B. Hence, gNBs 14 may cause interference to their neighboring cells when performing elevation beamforming and this interference may be very harmful for the system. In fact, if this interference is not mitigated, it is possible that employing elevation beamforming in a communication system will not lead to a system-level gain, since the increase in received signal level by dynamic beam selection may be less than the simultaneous increase in the interference level.

Figure 4:
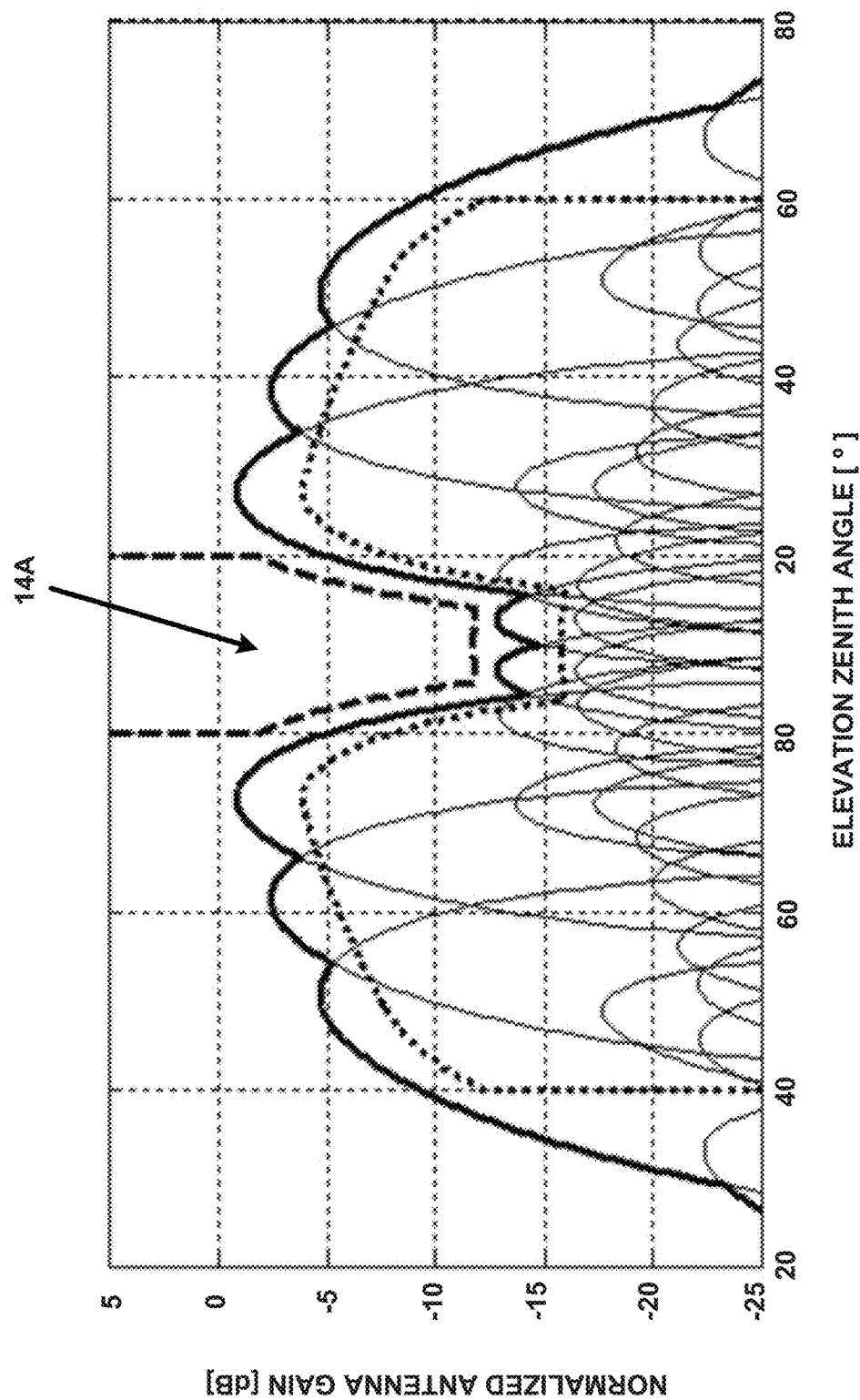
FIG. 4 is a graph illustrating a transmission gap at a particular elevation angle according to some embodiments of the present disclosure.

The concept of angular gap constrained transmission has been introduced to avoid beamforming in certain angular intervals where the caused interference to other cells would be large. Such transmission characteristics may be achieved by not offering an elevation beam in said critical directions, thereby creating a transmission "gap." FIG. 4 shows such a gap 16 as gap 16, where normalized antenna gain (y-axis) drops off in a range of elevation zenith angles (x-axis) compared to the antenna gain levels of adjacent zenith angles.

When elevation beamforming is used with codebook-based precoding, such a transmission gap 16 can be attained by codebook subset restriction, in which the gNB instructs the UE to not use a subset of the precoding matrices in that codebook which would correspond to beam directions causing excessive inter-cell interference. Note that there may also be azimuthal directions which can cause excessive inter-cell interference, and restricting the transmission in these directions may be beneficial as well.

The LTE precoder codebooks are based on DFT precoders as described above. Codebooks are defined for ranks 1-8 and are based on the quantities of:

$$\varphi_n = e^{j\pi n/2}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

where $v_{l,m}$ is defined for $l=0, \ldots, N_1 O_1 -1$, $m=0, \ldots, N_2 O_2 -1$, and is a 2D DFT precoder or beam that corresponds to $w_{2D}(k,l)$ $w_{2D}(l,m)$, the codebooks for all ranks are constructed based on the quantity $v_{l,m}$. As an example, the definitions of the rank-2 and rank-4 codebooks are given in Table 1 and Table 2, below, where $i_{1,1}$ and $i_{1,2}$ are the 2D DFT beam indices in each dimension and $i_2$ is the corresponding co-phasing index:

TABLE 1

| 2 Layers, Codebook-Config = 1 | | | |
| $i_{1,2} = 0, \ldots, N_2 O_2 - 1$ | | | |
| | | | |
| | $i_2$ | | |
| $i_{1,1}$ | 0 | 1 | 2 | 3 |
| --- | --- | --- | --- | --- |
| $0, \ldots, N_1 O_1 - 1$ | $W^{(2)}_{i_{1,1},i_{1,1},i_{1,2},i_{1,2},0}$ | $W^{(2)}_{i_{1,1},i_{1,1},i_{1,2},i_{1,2},1}$ | $W^{(2)}_{i_{1,1},i_{1,1},i_{1,2},i_{1,2},2}$ | $W^{(2)}_{i_{1,1},i_{1,1},i_{1,2},i_{1,2},3}$ | where $W^{(2)}_{l,l',m,m',n} = \frac{1}{\sqrt{2P}} \begin{bmatrix} v_{l,m} & v_{l',m'} \\ \varphi_n v_{l,m} & -\varphi_n v_{l',m'} \end{bmatrix}$.

TABLE 2

4 Layers, Codebook-Config = 1, $N_1 > 1$, $N_2 > 1$
$i_{1,2} = 0, 1, \ldots, N_2 O_2 - 1$

| $i_{1,1}$ | $i_2$ | |
|---|---|---|
| | 0 | 1 |
| $0, \ldots, N_1 O_1 - 1$ | $W^{(4)}_{i_{1,1},i_{1,1}+O_1,i_{1,2},i_{1,2},0}$ | $W^{(4)}_{i_{1,1},i_{1,1}+O_1,i_{1,2},i_{1,2},1}$ |
| $O_1 N_1, \ldots, 2 O_1 N_1 - 1$ | $W^{(4)}_{i_{1,1},i_{1,1},i_{1,2},i_{1,2}+O_2,0}$ | $W^{(4)}_{i_{1,1},i_{1,1},i_{1,2},i_{1,2}+O_2,1}$ | where $W^{(4)}_{l,l',m,m',n} = \dfrac{1}{\sqrt{4P}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$ In order to reduce codebook subset restriction (CBSR) signaling overhead, LTE FD-MIMO uses beam-based rank-agnostic CBSR signaling as opposed to PMI-based per-rank CBSR as was used in earlier releases of LTE. In PMI-based per-rank CBSR, precoders are restricted by signaling one or more bitmaps for each rank (i.e. 8 sets of bitmaps for ranks 1-8) and each bit in the bitmap restricts one PMI index (e.g. i1 or i2) for the codebook of a specific rank.

With beam-based rank-agnostic CBSR, on the other hand, the constituent 2D DFT beams $v_{l,m}$ are restricted instead, resulting in a size $N_1 N_2 O_1 O_2$ bitmap where each bit is associated with one oversampled 2D DFT beam, $v_{l,m}$. When a bit in the bit map is set, the corresponding DFT beam is restricted or should not be used for CSI estimation. Since the quantity $v_{l,m}$ are the constructing blocks for precoders of all ranks, a substantial overhead reduction in CBSR signaling is attained. Thus, a particular precoder in the codebook is restricted if any of the restricted beams $v_{l,m}$ is present in the precoder.

Beam-based CBSR requires a second set of restrictions to control rank and/or i2. These restrictions are indicated by a joint rank-i2 restriction in LTE, where a bitmap of the combinations of rank v and codebook index i2. As stated in 3GPP TS 36.213, bit $b_{g(v-1)+i_2}$ is associated with the precoder for v layers ($V \in \{1,2,3,4\}$) and codebook index $i_2$ where $g(\bullet)$ is given in Table 3, below:

TABLE 3

| Value of Codebook-Config | $g(\bullet)$ |
|---|---|
| 1 | {0, 4, 8, 10} |
| 2 | {0, 16, 32, 48} |
| 3 | {0, 16, 32, 48} |
| 4 | {0, 16, 32, 48} |

The NR Type I codebooks are similar in many ways to the LTE FD-MIMO codebooks, but contain some differences. One difference is that the rank-3 and rank-4 codebooks use "antenna grouping" when the number of antenna ports is larger than 16 (for the smaller than 16 port case, the rank-3 and rank-4 codebooks are similar to the LTE codebooks). This has led to the introduction of two quantities that correspond to 2D DFT beams: $v_{l,m}$ and $\tilde{v}_{l,m}$, where $v_{l,m}$ is used for the ranks 1,2,5,6,7,8 codebooks for 16 antenna ports and larger (and ranks 1-8 for smaller than 16 antenna ports) and $\tilde{v}_{l,m}$ is used for rank-3 and rank-4 codebooks for larger than or equal to 16 antenna ports. Here, it can be observed that co-phasing behavior is generalized from LTE, as there are now two parameters $\varphi_n$ and $\theta_p$ used to co-phase the 2D DFT beams $\tilde{v}_{l,m}$:

$$\varphi_n = e^{j\pi n/2}$$

$$\theta_p = e^{j\pi p/4}$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \ldots & e^{j\frac{4\pi l(N_1/2-1)}{O_1 N_1}} u_m \end{bmatrix}^T$$

As an example, the definitions of the rank-2 and the rank-4 codebooks are also given in Table 4 and Table 5, respectively:

TABLE 4

Codebook-Config = 1

| $i_{1,1}$ | $i_{1,2}$ | $i_2$ | |
|---|---|---|---|
| $0, 1, \ldots, N_1 O_1 - 1$ | $0, \ldots, N_2 O_2 - 1$ | 0, 1 | $W^{(2)}_{i_{1,1},i_{1,1}+k_1,i_{1,2},i_{1,2}+k_2,i_2}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$

TABLE 5

Codebook-Config = 1-2, $P_{CSI-RS} \geq 16$

| $i_{1,1}$ | $i_{1,2}$ | $i_{1,3}$ | $i_2$ | |
|---|---|---|---|---|
| $0, \ldots, \dfrac{N_1 O_1}{2} - 1$ | $0, \ldots, N_2 O_2 - 1$ | 0, 1, 2, 3 | 0, 1 | $W^{(4)}_{i_{1,1},i_{1,2},i_{1,3},i_2}$ | where $W^{(4)}_{l,m,p,n} = \dfrac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} & -\theta_p \tilde{v}_{l,m} \\ \varphi_n \tilde{v}_{l,m} & \varphi_n \tilde{v}_{l,m} & -\varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}$.

The beam-based rank-agnostic CBSR approach used in LTE cannot be directly re-used for NR as the same beam-based quantity is not constituent component of the precoders for all ranks. An alternative is to use the pre-"LTE FD-MIMO" CBSR approach based on PMI-based per-rank CBSR, however this would lead to around eight times more signaling overhead compared to LTE. In addition, NR codebooks use a generalized co-phasing behavior that is different from prior art codebooks in LTE, as there are now two parameters $\varphi_n$ and $\theta_p$ used to co-phase the 2D DFT beams $\tilde{v}_{l,m}$. The co-phasing behavior depends on the number of CSI-RS ports used in the codebook and on the rank of the report. Consequently, new mechanisms, such as those described throughout the present disclosure, are needed in NR for codebook restriction of co-phasing and rank.

The present description further relates to techniques for compressing codebook subset restriction signaling and is applicable to precoder codebooks where the per-rank codebooks may be divided in two groups. The precoders in the per-rank codebooks of the first group are all constructed using a first component while the precoders in the per-rank codebooks of the second group are all constructed using a second component, where the second component is different from the first component. In addition, each component can take a number of different values.

In particular, the techniques disclosed by the present disclosure are applicable (in a non-limiting fashion) to the NR Type I codebooks (for larger and equal to 16 antenna ports). In this case, the first group contains the per-rank codebooks for ranks 1, 2, 5, 6, 7, 8, where the precoders are all constructed based on the component $v_{l_1,m}$, which is defined for $l_1=0, \ldots, N_1O_1-1$, $m=0, \ldots, N_2O_2-1$ and constitutes a size-$N_1N_2$ 2D DFT vector. The second group contains the per-rank codebooks for ranks 3 and 4, where the precoders are all constructed based on the component $\tilde{v}_{l_2,m}$, defined for $l_2=0, \ldots, (N_1/2)O_1-1$, $m=0, \ldots, N_2O_2-1$.

Figure 5:
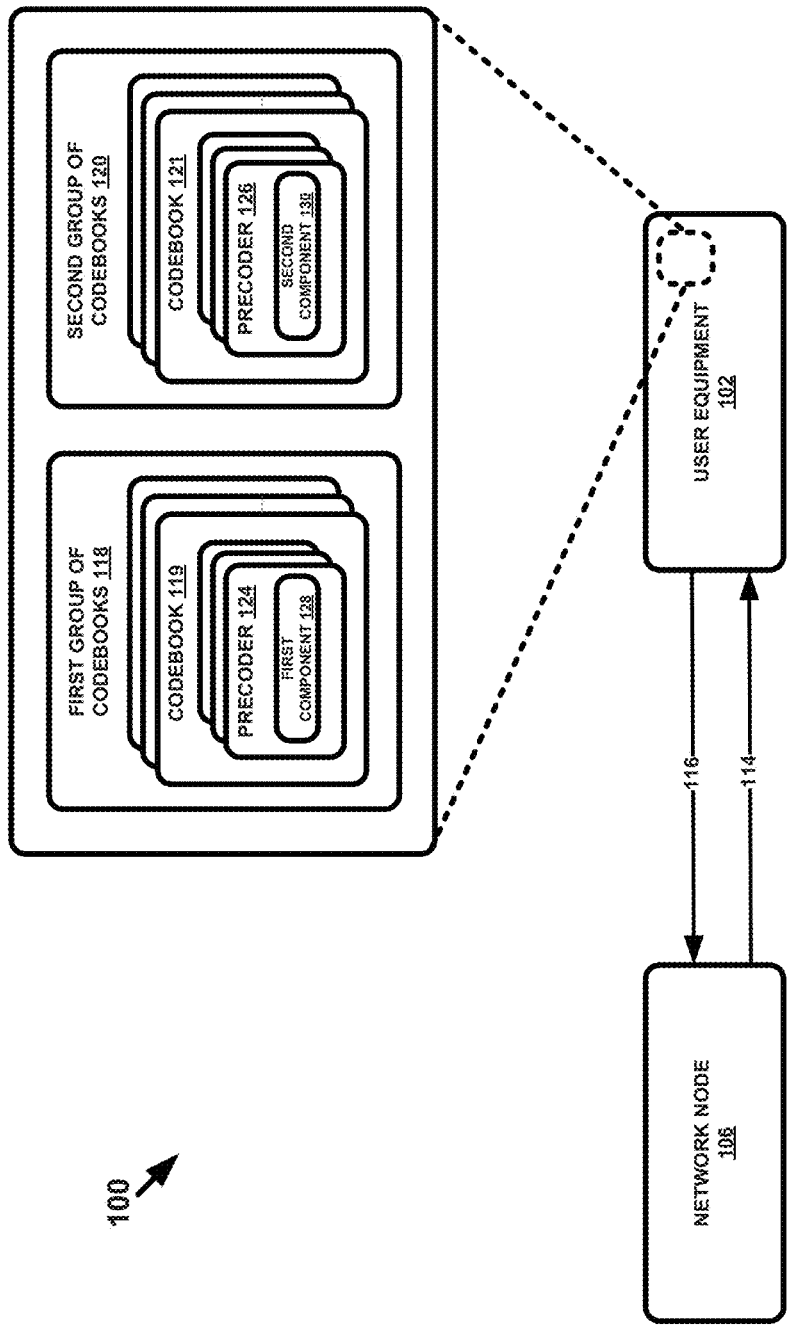
FIG. 5 illustrates a wireless communication system corresponding to example embodiments of the present disclosure.

These groups of codebooks are illustrated in FIG. 5, which illustrates a wireless communication system 100 that includes a network node 106 and a UE 102 in wireless communication over one or more communication channels. As shown, the UE 102 may divide the codebooks possible for utilization by network node 106 into separate groups, such as first group of codebooks 118 and second group of codebooks 120. The UE may receive CBSR signaling 114 from the network node on the downlink, and may restrict precoders of the codebooks from the first 118 and second 120 groups of codebooks based on one or more components indicated in the CBSR signaling 114 (also referred to herein simply as CBSR). The UE 102 can select a precoder from the restricted codebooks and report the selected precoder to the network node 106 in CSI message 116 in the uplink. The example embodiments described in reference to the figures that follow detail how the restriction and selection may be undertaken in the disclosed techniques.

In a first technique, a codebook subset restriction or indication thereof is signaled from a network node 106 to a UE 102 via CBSR signaling 114 containing a first component 128, or an indication thereof, which is used for defining the CBSR for precoders 124 in the first group of codebooks 118. The restricted first components 128 are then mapped or has a mapping to restricted second components 130 using or based on a predefined mapping. The CBSR of the precoders in the second group of codebooks 120 is defined based on the restricted second components 130. Within the first group, beam-based rank-agnostic CBSR is applied to define the CBSR for the first per-rank codebooks according to existing techniques. Namely, each precoder in the first group of codebooks 118 that is constructed using one or more of the restricted first components 128 are not allowed to be used for CSI reporting by the UE.

To derive the restriction of the precoders 126 in the second group 120, a mapping between first components and second components are made, wherein each first component can be mapped or maps to one or more second component. Or, equivalently, each second component 130 is mapped or maps to one or more first components 128. Thus, each second component 130 can be mapped or maps to one or more first components 128 and each first component 128 can be mapped or maps to one or more second components 130. Based on this mapping and the restricted first components 128, a restriction of the second components 130 is determined such that if at least one restricted first component 128 is mapped to a second component 130, that second component 130 is restricted.

Figure 6:
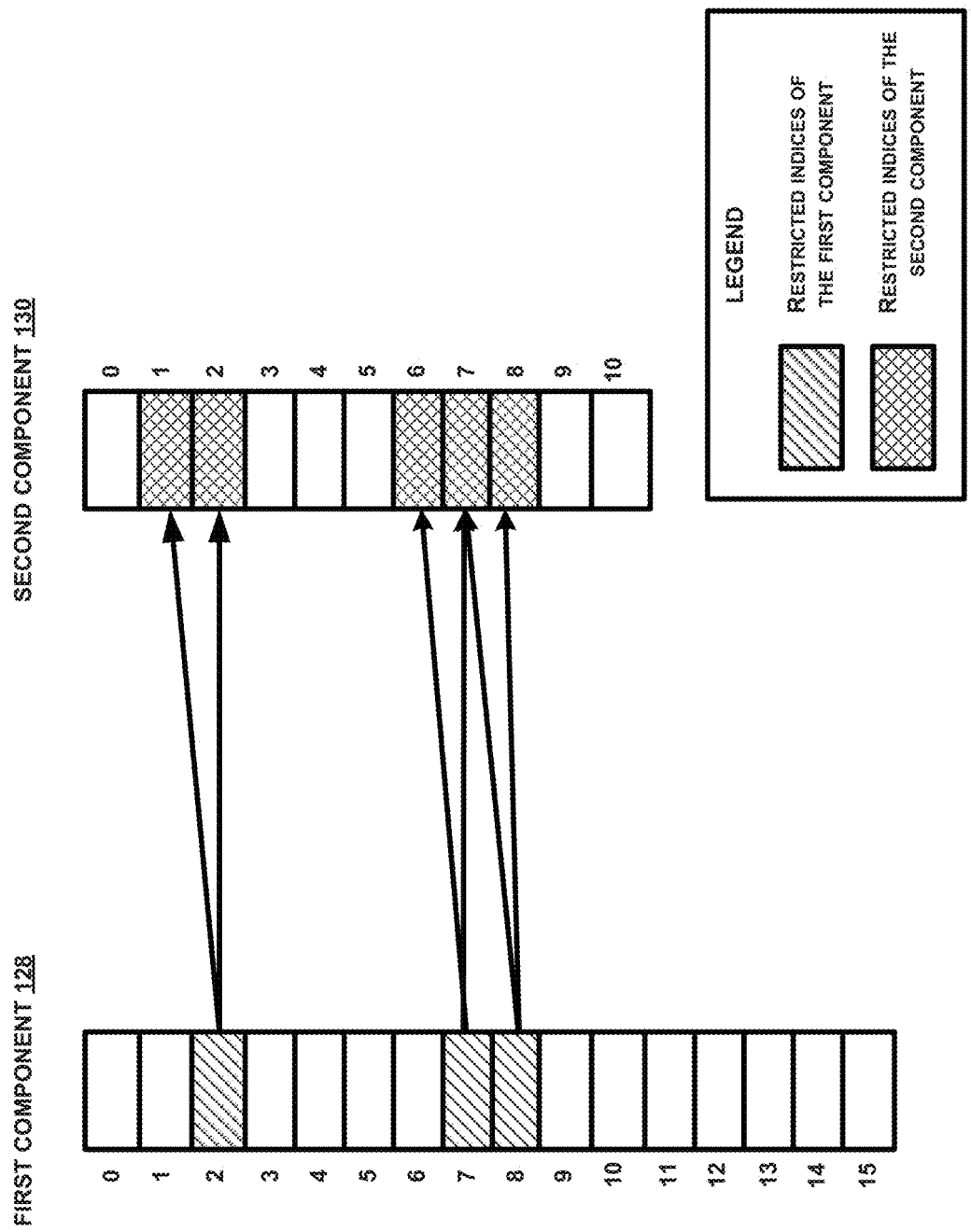
FIG. 6 illustrates an example of how a first component maps to a second component in one or more embodiments.

This principle is illustrated in the example mapping diagram in FIG. 6, which illustrates how indices of a first component 128 (or restriction thereof) might map to those of a second component 130. As can be seen in the diagram, the first components 128 with indices 2, 7, and 8 are restricted. The first component with index 2 maps to second components 130 with indices 1 and 2, which implies that these second components are restricted. Based on the determined restricted second components, the CBSR for the precoders of the per-rank codebooks in the second group can be determined by applying beam-based rank-agnostic CBSR within the second group.

Thus, with this method, only a restriction of the first component needs to be signaled to define the CBSR, which keeps down the overhead for CBSR signaling. In some embodiments, the NR Type I codebooks is used, where the first and second groups are defined as above. The signaling of the restriction of the first component may for instance be done using a length $N_1N_2O_1O_2$ bitmap $a_0a_1 \ldots a_{N_1N_2O_1O_2-1}$ where each bit is mapped to a $(l_1,m)$ value which in turn indicates the restriction of the first component 128. For purposes of the present disclosure, the term "component" (e.g., as used in the terms "first component(s)" and "second component(s)," and the like) can correspond to a numerical vector. The first component 128, for instance, may be referred to through the present disclosure mathematically as $v_{l_1,m}$. Likewise, the second component may be represented mathematically in the present disclosure as $\tilde{v}_{l_2,m}$. Generally, any component or entity described according to the format $v_{l_x,m}$ or $\tilde{v}_{l_x,m}$ identifies a vector representation of a component, as introduced above. Furthermore, though the term "component" is particularly defined for purposes of the present disclosure as well as a corresponding mathematical representation of the component/vector, it should also be appreciated that each component and mathematical representation thereof represents, in practical terms, a particular beam direction for wireless transmission.

The mapping between $v_{l_1,m}$ and $\tilde{v}_{l_2,m}$ will now be explained. First of all, $v_{l_1,m}$ may be a 2D DFT vector that is applied to (each polarization of) the antenna array while $\tilde{v}_{l_2,m}$ may be a 2D DFT beam of half-size compared to $v_{l_1,m}$, which is applied to (each polarization of) each antenna group of the antenna array and where each of the two antenna groups are formed by splitting the antenna array in half along the first dimension (which is typically the horizontal dimension). Thus, $\tilde{v}_{l_2,m}$ is applied to both the left half and the right half of the antenna array. This means that the corresponding beamwidth of $\tilde{v}_{l_2,m}$ is twice that of $v_{l_1,m}$ along the first dimension (since half the array is used to form the beam) while the beamwidth along the second dimension is the same. To form the rank-4 transmission, different cophasing between antenna groups and polarizations is applied for the different layers, but the resulting beam shape will be similar to the beam shape of $\tilde{v}_{l_2,m}$.

In some example embodiments, the mapping between $v_{l_1,m}$ and $\tilde{v}_{l_2,m}$ is only performed when the number of antenna ports is greater or equal to 16, and the CBSR for rank-3 and rank-4 codebooks is achieved by applying beam-based CBSR using the restricted $\tilde{v}_{l_2,m}$. In these examples, when the number of antenna ports is less than 16, for rank-3 and rank-4 codebooks, beam-based CBSR is applied using the set $v_{l_1,m}$.

Thus, as the properties of the beam shape along the second dimension is the same for $\tilde{v}_{l_2,m}$ and $v_{l_1,m}$, the problem can be reduced to finding a mapping rule in the first dimension, i.e., to find a mapping rule between the indices $l_1$ and $l_2$. To derive such relationship, one can study the entries of the array steering vector $e^{j2\pi \sin(\phi)d_\lambda n}$, where $\phi$ is the steering angle, $d_\lambda$ the array element separation in wavelengths and n the array element index. This indicates that a beam is to be steered to angle $-\phi$ for an array with $d_\lambda$ element separation, the phase $e^{j2\pi \sin(\phi)d_\lambda n}$ shall be applied to each array element n (i.e., the complex conjugate of the steering phase shall be applied).

The first component $v_{l_1,m}$ has a phase progression of $$e^{\frac{j2\pi l_1 n}{O_1 N_1}}$$

along the first dimension while the second component $\tilde{v}_{l_2,m}$ has a phase progression of $$e^{\frac{j2\pi l_2 n}{O_1(N_1/2)}}.$$

Thus, to steer the beam towards the same angle, $$\sin(\phi)d_\lambda = \frac{l_1}{O_1 N_1} = \frac{l_2}{O_1(N_1/2)}$$

should hold. This implies that $l_2=l_1/2$ results in the same beam direction. Thus, in an embodiment, the mapping between restricted first and second components is given as follows. If an (sub)-index $l_1$ of the first component is restricted, the (sub)-index $l_2=l_1/2$ is restricted for the second component. Note that for odd $l_1$, $$\frac{l_1}{2}$$

is not an integer and so does not map to an $l_2$ index. In one embodiment, the odd $l_1$ values are simply ignored so that there is a one-to-one mapping between restricted first and restricted second components. In another embodiment, both $l_2=\lceil l_1/2 \rceil$ and $l_2=\lfloor l_1/2 \rfloor$ are restricted if $l_1$ is restricted and $l_1$ is odd, meaning that one first component restricts two second components in that case.

In yet another embodiment, $l_2=\lfloor l_1/2 \rfloor$ is restricted if $l_1$ is restricted. For example, if $l_1=11$ or $l_1=10$ is restricted, then $l_2=5$ is also restricted in rank 3 and rank 4 codebooks. Alternatively, $l_2=\lceil l_1/2 \rceil$ is restricted if $l_1$ is restricted. For example, if $l_1=11$ is restricted, then $l_2=6$ is also restricted in rank 3 and rank 4 codebooks.

Since the beamwidth of $\tilde{v}_{l_2,m}$ is twice that of $v_{l_1,m}$, it would make sense that the restriction of $\tilde{v}_{l_2,m}$ depends on several adjacent, $v_{l_1,m}$. Thus, in some embodiments, the second component corresponding to the index $l_2$ is restricted if any of the first components corresponding the interval $[\text{mod}(2l_2-\Delta_1,N_1O_1),\text{mod}(2l_2+\Delta_2,N_1O_1)]$ of index $l_1$ is restricted. Since the beam index is wrapped around $N_1O_1$ (i.e. $l_1=0$ and $l_1=N_1O_1$ corresponds to the same beam direction), the module operator is used. The interval essentially defines a size $\Delta_1+\Delta_2+1$ window around $l_1=2l_2$ of restricted first components that impact the restriction of the second component with (sub)-index $l_2$. In some such embodiments, a symmetric window is used, so that $\Delta_1=\Delta_2$. A good choice may be $\Delta_1=\Delta_2=1$, i.e. a size 3 window, due to that the beamwidth corresponding to second components is twice that of first components. In another embodiment $\Delta_1=O_1$ and $\Delta_2=O_1-1$ so that a size $2O_1$ windows is used in order to be more conservative in the restriction.

In a further aspect of the present disclosure, separate CBSRs are signaled for the first group and the second group. The CBSR signaling for the first group defines a restriction of the first component while the CBSR signaling for the second group defines a restriction of the second component. The CBSR signaling for the first group thus determines the CBSR for the precoders of certain ranks while the CBSR signaling for the second group determines the CBSR for the precoders of other ranks. In some embodiments, the signaling of the CBSR corresponding to the second group depends on the number of antenna ports configured. For instance, when the number of antenna ports is less than 16, the CBSR corresponding to the second group is not signaled. When the number of antenna ports is larger than or equal to 16, the CBSR corresponding to the second group is signaled. In one embodiment, the NR Type I codebook is used and the CBSR signaling comprises two bitmaps:

one length $N_1N_2O_1O_2$ bitmap $a_0a_1 \ldots a_{N_1N_2O_1O_2-1}$ where each bit is mapped to an $(l_1,m)$ value which in turn indicates the restriction of the first component $v_{l,m}$, and
one length $(N_1/2)N_2O_1O_2$ bitmap $b_0b_1 \ldots b_{(N_1/2)N_2O_1O_2-1}$ where each bit is mapped to an $(l_2,m)$ value which in turn indicates the restriction of the second component $v_{l_2,m}$.

Furthermore, rather than receive only a first component or indication thereof in CBSR, the UE can receive a second component or indication thereof for codebook subset restriction as well. Thus, in some examples, the UE can receive CBSR from a network node, the CBSR indicating a first component for codebook restriction of a first group of codebooks. In these examples, the first component can be common to precoders of the first group of precoders. In addition, the CBSR can indicate a second component for codebook restriction of a second group of codebooks, where the second component is common to precoders of the second group of precoders. In an aspect of these example embodiments, the second component can be different than the first component. Thus, according to these components, the UE can restrict precoders selectable from a codebook in the first group of codebooks based on the first component and can restrict precoders selectable from a codebook in the second group of codebooks based on the second component.

In a further aspect, a UE can receive a joint indication of a combination of a rank value and a first index and/or a second index. In an aspect of these example embodiments, the first index identifies at least a first complex number that scales a two-dimensional (2D) Discrete Fourier Transform (DFT) beam and the second index identifies at least a second complex number that also scales the 2D DFT beam. The UE can also determine a number of states that the first index and/or second index can attain according to (a) the rank value and (b) at least one of a codebook configuration and a number of channel state information (CSI) reference signal ports.

In some embodiments, a UE 102 may implement co-phasing and rank subset restriction as a mechanism of adjusting combinations used in CSI reporting. In particular, this mechanism can include a UE 102 receiving a joint indication of combinations of a rank value and a first index and/or a second index from a network node 106, where the first index identifies at least a first complex number $\varphi_n$ that scales a 2D DFT beam, the second index identifies at least a second complex number that also scales the 2D DFT beam. Based on the joint indication, the UE 102 can determine a number of states that the first and/or second index can attain according to the rank value and a codebook configuration and/or a number of CSI-RS ports. Furthermore, the mechanism can involve the UE 102 generating a CSI report that indicates only the values of rank and the first index and/or second index that are permitted according to the joint indication. Naturally, the UE 102 can also transmit the generated CSI report to a network node 106.

In an additional feature of the present embodiments, co-phasing and rank may be jointly indicated using a bitmap identifying combinations of a first and/or second index (such as $i_{1,3}$ and $i_2$) and a rank indication v. According to this optional aspect, the codebook subset restriction bitmap value $b_{g(v-1)+C_2 i_{1,3}+C_1 i_2}$ is associated with the precoder for v layers. Codebook index $i_{1,3}$ identifies the state of a first co-phasing parameter $\theta_p$, and index $i_2$ identifies the state of a second co-phasing parameter $\varphi_N$. Vector $c_n$ is a noise/interference vector indicating the results of a random process. Additionally, depending on the ordering of bits in the bitmap used for a particular embodiment, $C_2=4$, and $C_1=2$ or $C_2=2$, and $C_1=4$. The remaining factor, g(•) can be defined according to Table 6, below:

TABLE 6

| Value of Codebook-Config, with Number of CSI-RS ports $P_{CSI-RS}$ | g(•) |
| --- | --- |
| 2 with $P_{CSI-RS} < 16$ | {0, 16, 24, 26, 28, 30, 32, 34} |
| 2 with $P_{CSI-RS} \geq 16$ | {0, 16, 24, 32, 40, 42, 44, 46} |
| 1 with $P_{CSI-RS} < 16$ | {0, 4, 6, 8, 10, 12, 14, 16} |
| 1 with $P_{CSI-RS} \geq 16$ | {0, 4, 6, 14, 22, 24, 26, 28} |

The configuration Codebook-Config in Table 6 identifies the number of states used for the second index $i_2$ for certain values of rank, such as 1 or 2. If Codebook-Config=2, the second index $i_2$ identifies both a selected beam $v_{l,m}$ out of a beam group of L beams in a given subband, as well as the second cophasing parameter $\varphi_N$. The NR codebook design uses L=4 beams in a beam group for ranks 1 and 2 of Codebook-Config=2, consequently requiring 4 states and 2 bits, in addition to the 4 or 2 states and 2 or 1 bit required for the second cophasing parameter $\varphi_N$. Therefore, Codebook-Config 2 requires 16 and 8 states for rank 1 and 2, respectively, to represent the second cophasing parameter $\varphi_n$, and 4 or 3 bits for the second index $i_2$ in this case.

By contrast, Codebook-Config 1 uses L=1 beams in a beam group for all ranks, so the second index $i_2$ only identifies the parameter $\varphi_n$ for Codebook-Config 1. Codebook-Config 1 then requires 4 and 2 states for rank 1 and 2, respectively, to represent the second cophasing parameter $\varphi_n$, and 2 or 1 bit(s) for the second index $i_2$ in this case. The parameter $\theta_p$ requires 4 states, and so $i_{1,3}$ then uses 2 bits. Since the parameter $\theta_p$ may only be used in some conditions, such as for ranks 3 and 4, and when the number of CSI-RS ports $P_{CSI-RS}$ used in the codebook is greater than or equal to 16, then the additional states or bits for $\theta_p$ are not needed in all codebook configurations.

The performance benefits from a larger number of states used for co-phasing parameter $\varphi_n$ tends to diminish as the rank increases. Consequently, the number of states used for $\varphi_n$ can be 4 for rank 1 and 2 for higher ranks, such as ranks 2 through 8. This means that above rank 4, $i_2$ can require only 1 bit.

Moreover, it can be seen that a mechanism to indicate codebook subset restriction jointly for rank, the first and second co-phasing parameters, and beam selection from a beam group can be broken down into two independent conditions: (a) whether the number of beams L in the beam group is greater than 1 (or, equivalently, if Codebook-Config=2), and (b) whether the number of CSI-RS ports used in the codebook $P_{CSI-RS}$ is greater than or equal to 16 (or, equivalently, whether the number is less than 16). These conditions lead to the embodiment illustrated in Table 6, above, where the function g(•) is determined according to the status of these two conditions, as evidenced by each of the four permutations being indicated on one of the four rows.

The function g(•) represents the accumulation of the number of possible values of codebook indices $i_{1,3}$ and $i_2$ over the prior ranks v. Therefore, for Codebook-Config=2 and $P_{CSI-RS}<16$, since the parameter $\theta_p$ is not indicated for ranks 3 and 4, and since 16 and 8 states are required for ranks 1 and 2, respectively for $i_2$, while 2 states are required for ranks greater than 2 for $i_2$, g(v)=g(v−1)+Δ(v), where Δ(v)={0, 16, 8, 2, 2, 2, 2, 2} and 1<v≤8, and g(v=1)=0. For Codebook-Config=2, with $P_{CSI-RS} \geq 16$, since the parameter $\theta_p$ is indicated for ranks 3 and 4, and since the number of states needed for ranks 1 and 2 is not influenced by the number of CSI-RS ports, in this case g(v)=g(v−1)+Δ(v), where Δ(v)={0, 16, 8, 8, 8, 2, 2, 2} and 1<v≤8, and g(v=1)=0. For Codebook-Config=1, with $P_{CSI-RS}<16$, since the parameter $\theta_p$ is not indicated for ranks 3 and 4, and since 4 and 2 states are required for ranks 1 and 2, respectively for $i_2$, while 2 states are required for ranks greater than 2 for $i_2$, in this case g(v)=g(v−1)+Δ(v), where Δ(v)={0, 4, 2, 2, 2, 2, 2, 2} and 1<v≤8, and g(v=1)=0. For Codebook-Config=1, with $P_{CSI-RS} \geq 16$, since the parameter $\theta_p$ is indicated for ranks 3 and 4, and since 4 and 2 states are required for ranks 1 and 2, respectively for $i_2$, while 2 states are required for ranks greater than 2 for $i_2$, in this case g(v)=g(v−1)+Δ(v), where Δ(v)={0, 4, 2, 8, 8, 2, 2, 2} and 1<v≤8, and g(v=1)=0.

Therefore, in an embodiment, a mechanism of adjusting combinations used in CSI reporting in a UE 102 is provided. For example, such a mechanism may include a UE 102 receiving a joint indication of combinations of a rank value and a first index and/or a second index. In an aspect, this first index identifies (at least) a first complex number $\varphi_n$ that scales a 2D DFT beam, while the second index identifies (at least) a second complex number that also scales the 2D DFT beam. The mechanism can also include the UE 102 determining the number of states that the first and/or second index can attain according to the rank value and at least one of a codebook configuration and a number of CSI-RS ports. Furthermore, the UE 102 can generate a CSI report that only indicates values of rank and the first index and/or second index that are permitted according to the joint indication.

Finally, the UE 102 can round out the mechanism by transmitting the CSI report to a network node 106.

In view of the details presented above, example methods will now be presented in reference to the figures. FIGS. 7A-7E show flow diagrams of five example methods that may, in some examples, be performed by the UE 102 to carry out the techniques discussed above. In addition. FIGS. 8A-8C show flow diagrams of three non-limiting methods that may be performed by the network node 106 in some examples.

Figure 7A:
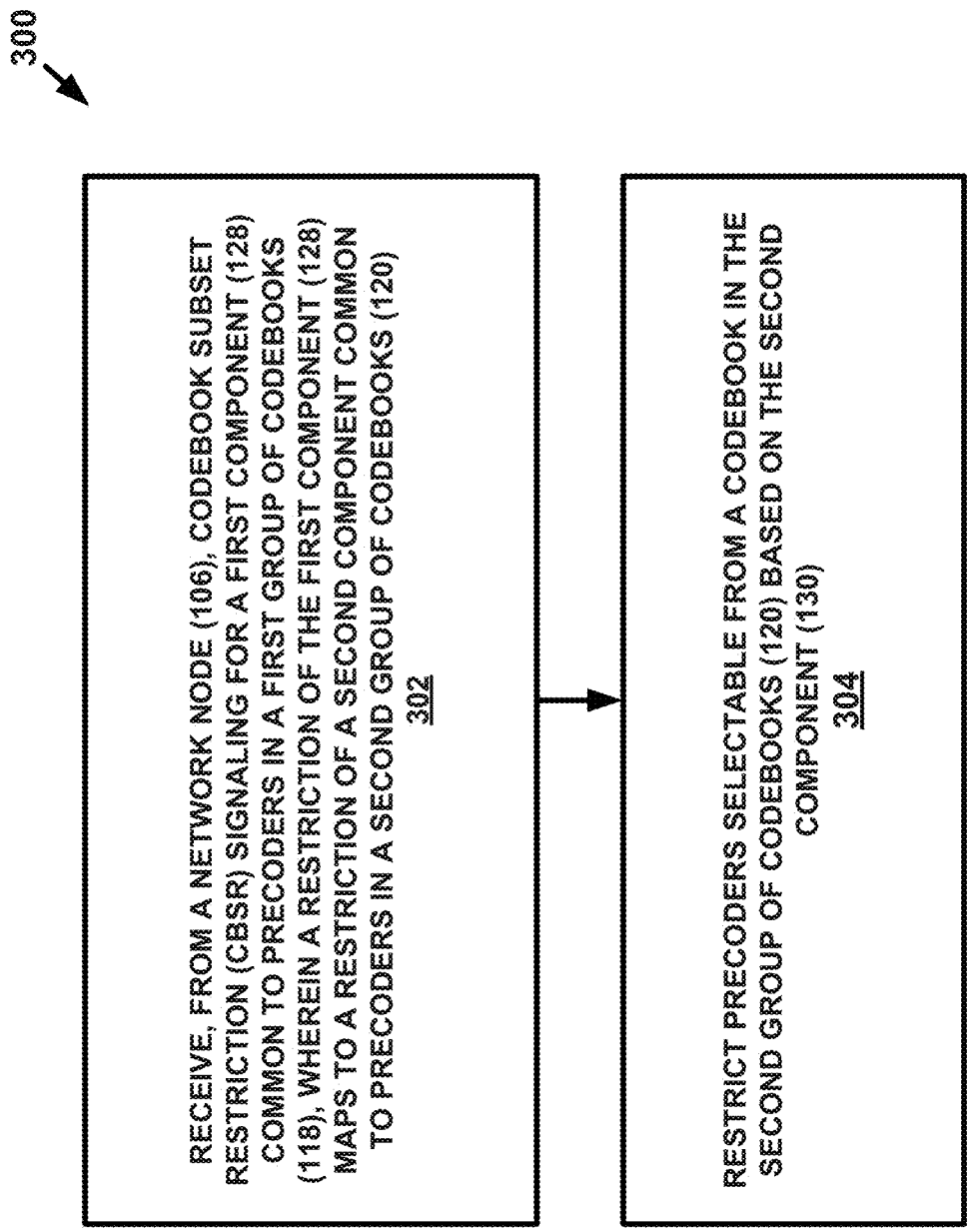
FIG. 7A illustrates a method performed by a UE according to one or more embodiments.
Figure 8B:
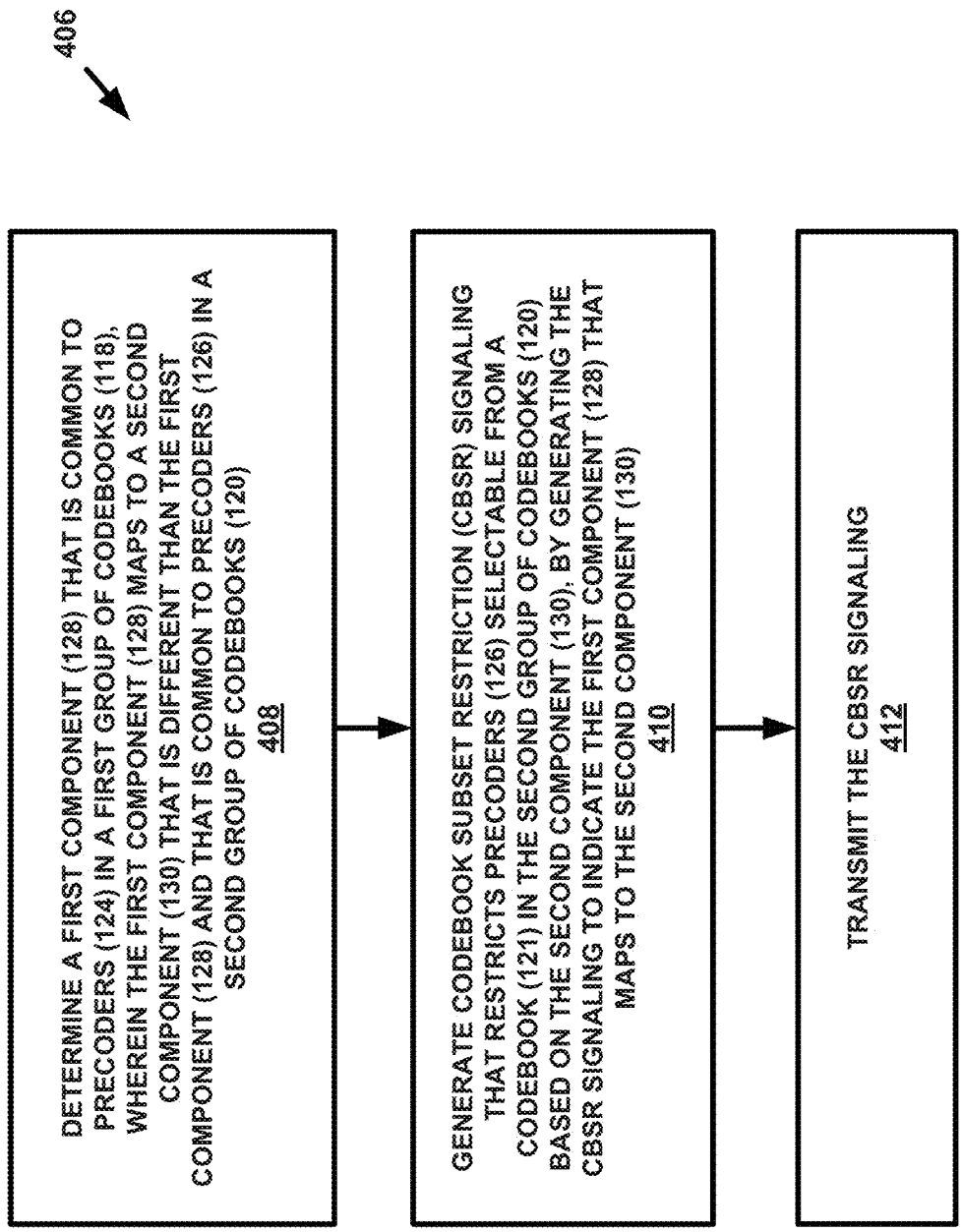
FIG. 8B illustrates a method performed by a network node according to one or more embodiments.
Figure 8C:
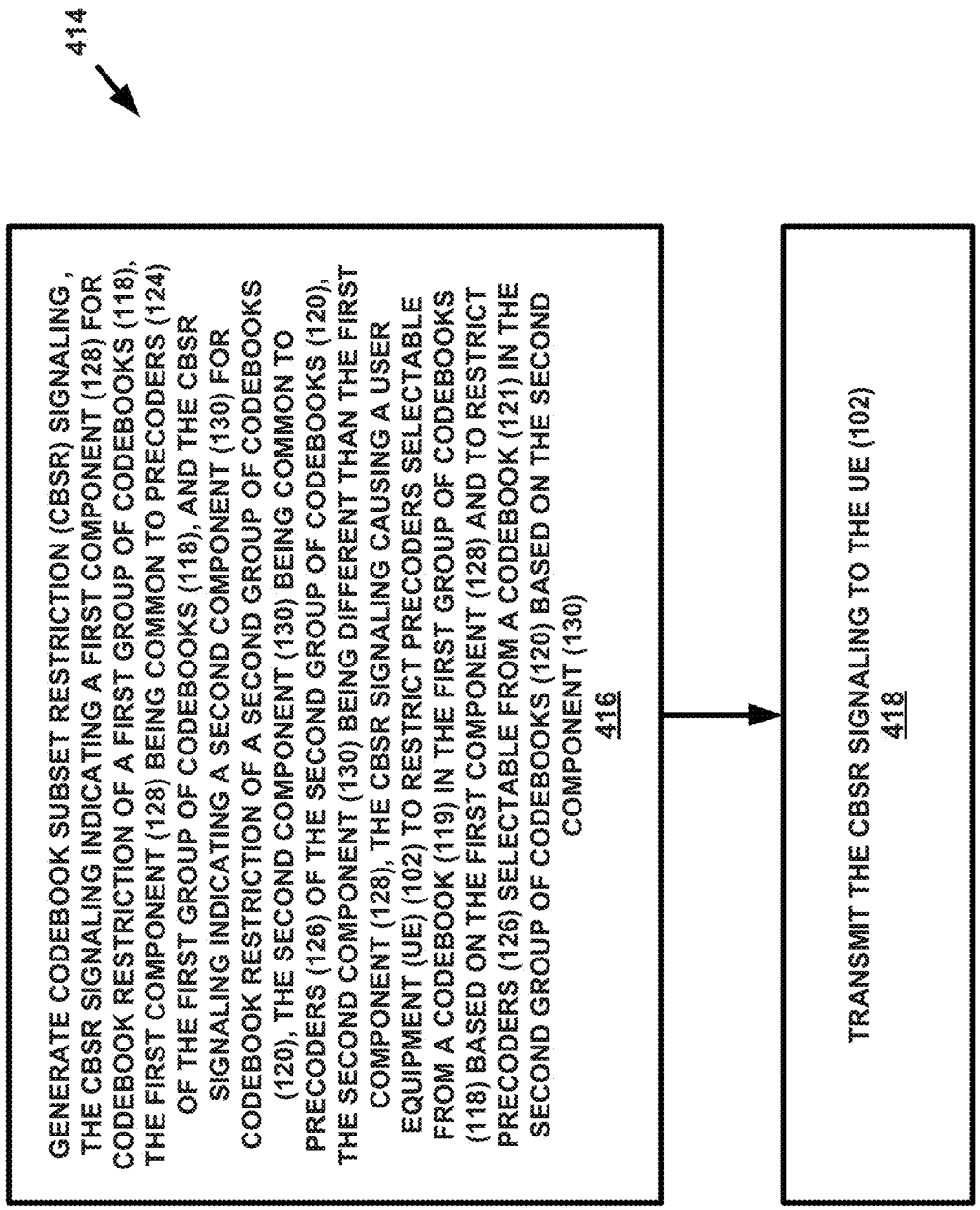
FIG. 8C illustrates a method performed by a network node according to one or more embodiments.

Specifically, FIG. 7A illustrates an example method 300 for carrying out the above-described aspects at UE 102. As illustrated, at block 302, the UE 102 can receive CBSR signaling for a first component 128 common to precoders in a first group of codebooks 118. As discussed at length above, a restriction of the first component 128 maps or can map to a restriction of a second component. As also described above, the second component 130 is common to precoders in a second group of codebooks 120. In addition, at block 304, the UE 102 can restrict precoders selectable from a codebook in the second group of codebooks 120 based on the second component 130. For purposes of the present disclosure, the term "restrict" or "restricting" can mean "defining a restriction of a component or components."

Figure 7B:
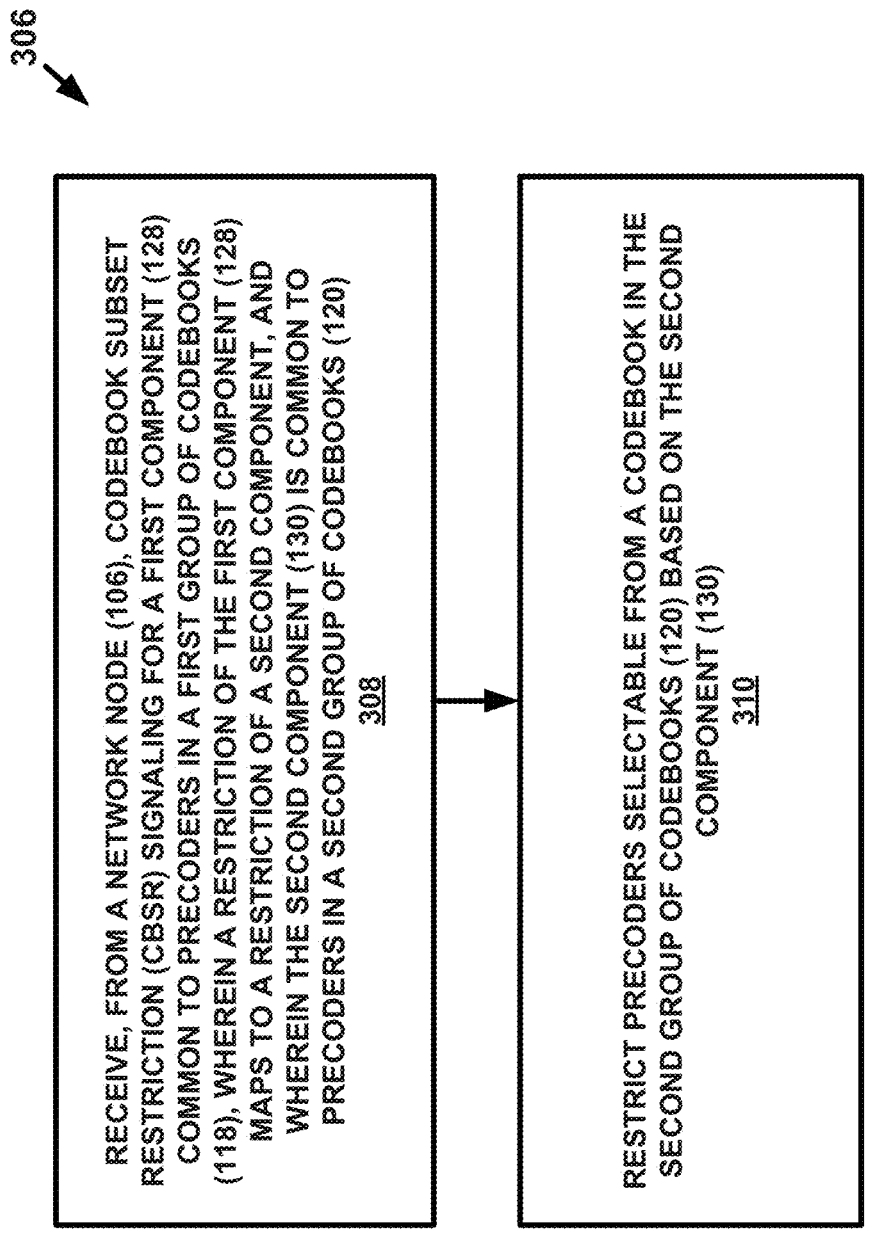
FIG. 7B illustrates a method performed by a UE according to one or more embodiments.

Turning to FIG. 7B, another example method 306 for codebook subset restriction at a UE 102 is provided. As shown, at block 308, method 306 can include receiving, from a network node 106, CBSR signaling for a first component 128 common to precoders in a first group of codebooks 118. In further aspects, the first component 128 maps to a second component 130 and the second component 130 is common to precoders in a second group of codebooks 120. In addition, at block 310, method 306 can include restricting precoders selectable from a codebook in the second group of codebooks 120 based on the second component 130.

Figure 7C:
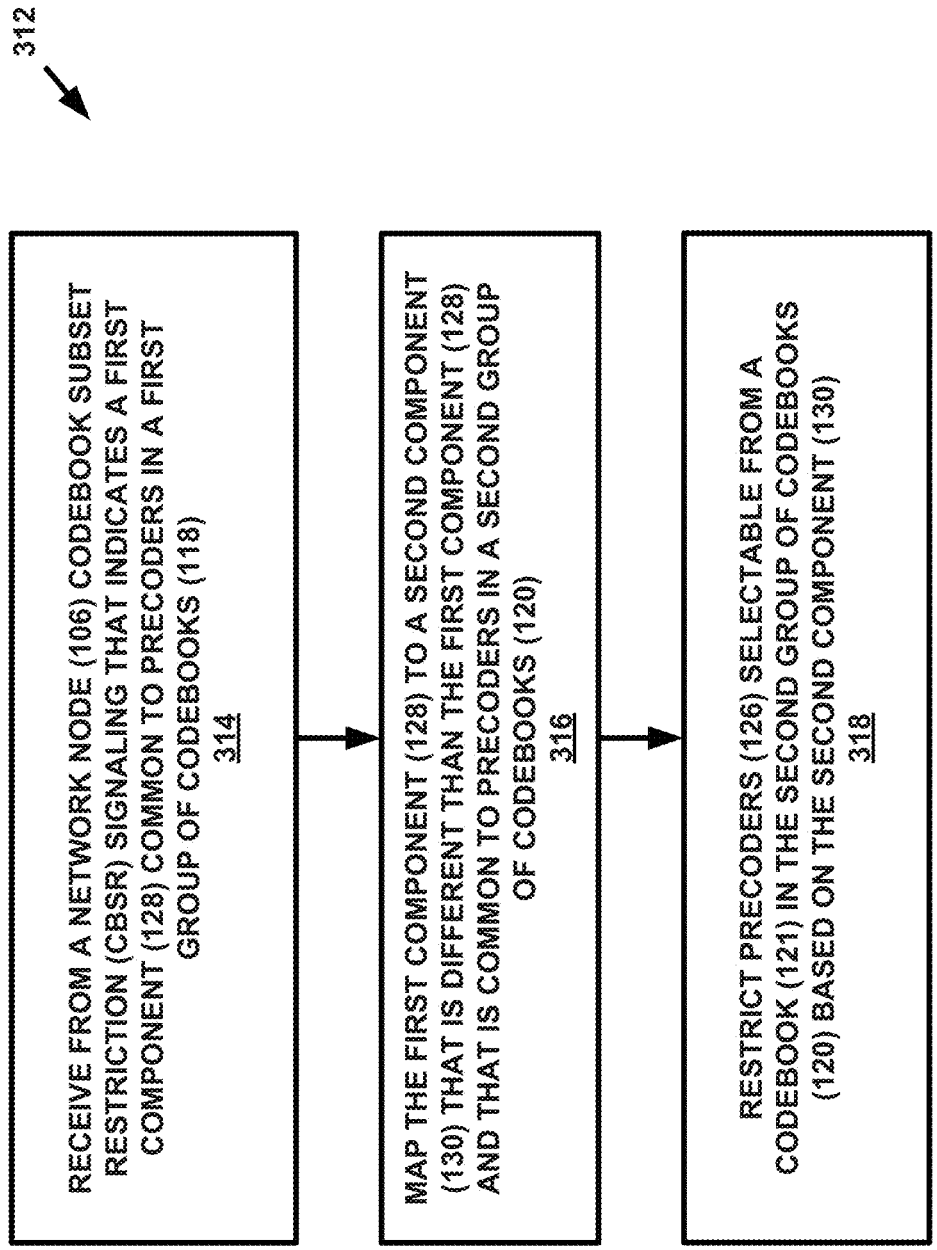
FIG. 7C illustrates a method performed by a UE according to one or more embodiments.

A further example embodiment of a method 312 for codebook subset restriction at a UE is shown in FIG. 7C. In method 312, at block 314, the UE 102 can receive, from a network node 106, CBSR signaling that indicates a first component 128 common to precoders in a first group of codebooks 118. In addition, at block 316, the UE 102 can map the first component 128 to a second component 130 that is different than the first component 128 and that is common to precoders in a second group of codebooks 120. Furthermore, at block 318, method 312 includes restricting precoders 126 selectable from a codebook 121 in the second group of codebooks 120 based on the second component 130.

Figure 7D:
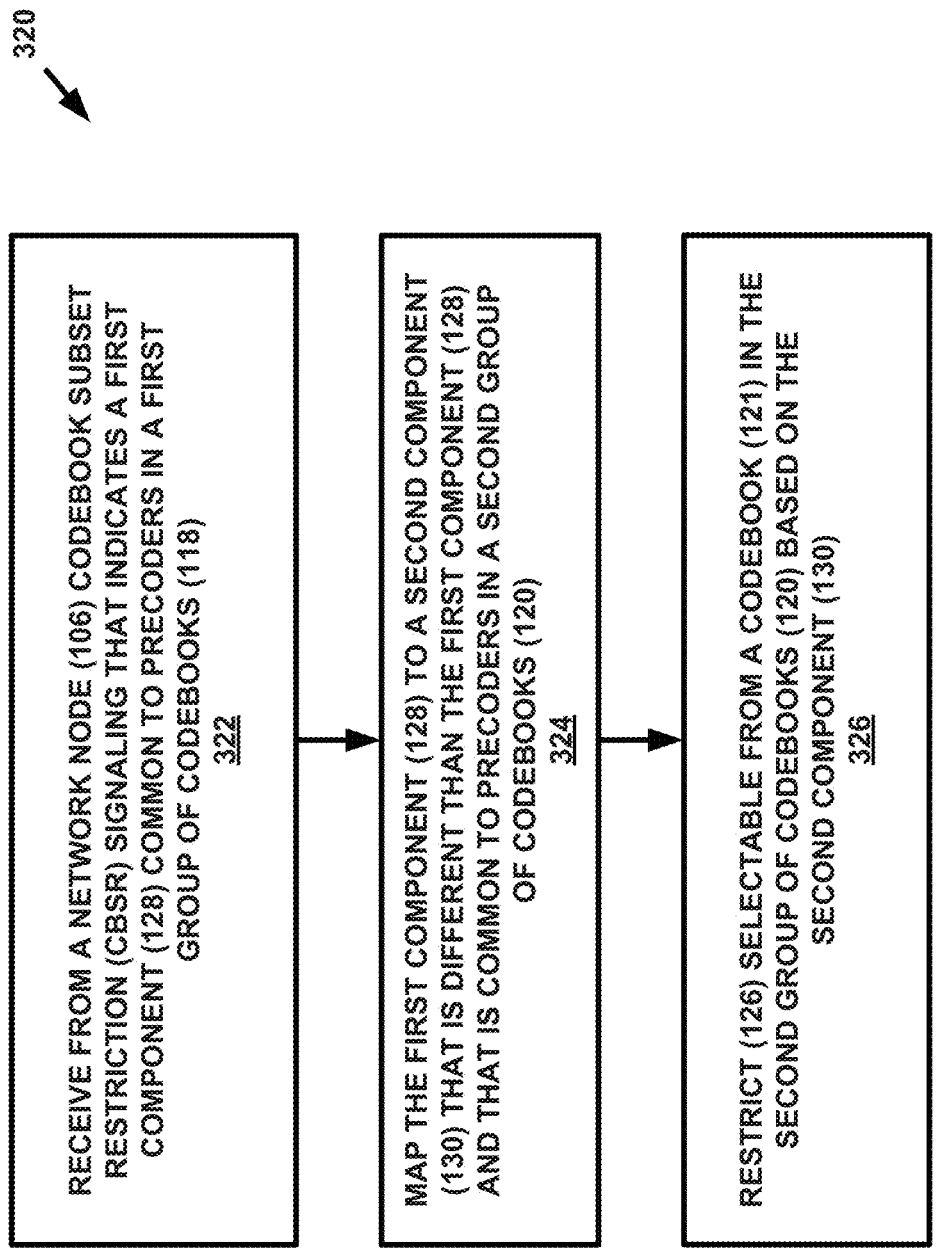
FIG. 7D illustrates a method performed by a UE according to one or more embodiments.

In another example embodiment shown in FIG. 7D, method 320 can include, at block 322, receiving codebook subset restriction CBSR signaling from a network node 106 that indicates a restriction for a first component 128 common to precoders 124 in a first group of codebooks 118. The method may also include, at block 324, mapping the restriction for the first component 128 to a restriction for a second component 130. Again, the second component 130 can be different than the first component 128 and can be common to precoders 126 in a second group of codebooks 120. Additionally, method 320 can include, at block 326, restricting precoders 126 selectable from a codebook 121 in the second group of codebooks 120 based on the restriction for the second component 130.

Figure 7E:
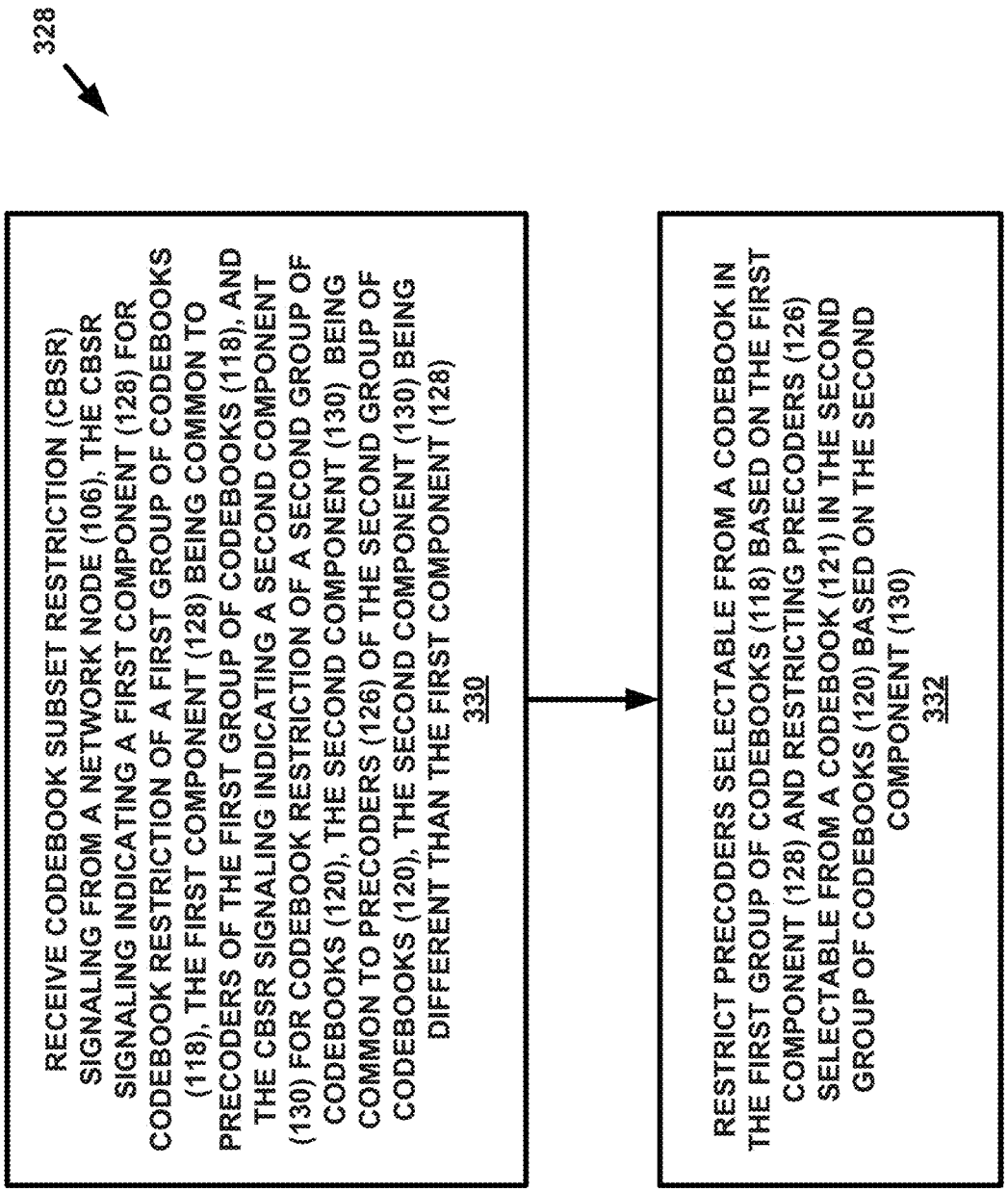
FIG. 7E illustrates a method performed by a UE according to one or more embodiments.

FIG. 7E presents yet another example method 328 for codebook selection restriction at a user equipment UE 102. As shown in the flowchart, at block 330, the method 328 can include receiving codebook subset restriction CBSR signaling from a network node 106, the CBSR signaling indicating a first component 128 for codebook restriction of a first group of codebooks 118. The CBSR signaling can indicate a second component 130 for codebook restriction of a second group of codebooks 120, the second component 130 being different than the first component 128. In addition, at block 332, method 328 can include restricting precoders selectable from a codebook in the first group of codebooks 118 based on the first component 128 as well as restricting precoders 126 selectable from a codebook 121 in the second group of codebooks 120 based on the second component 130.

Further aspects not explicitly shown in one or more of FIGS. 7A, 7B, 7C, 7D, and 7E may also be realized by the UE 102 in further embodiments, including those that include the following features. For example, in some embodiments, the first component is a vector from a first set of vectors, and the precoders in the first group of codebooks include one or more vectors from the first set of vectors. In some examples, the second component is a vector from a second set of vectors, where the precoders in the second group of codebooks include one or more vectors from the second set of vectors. In some instances, the second component constitutes a vector of a different size than that of the first component, such as where vectors in the second set of vectors are half the size of the vectors in the first set of vectors Furthermore, in some instances, the CBSR signaling can include a bitmap that contains a plurality of bits, where each bit of the plurality of bits indicates a vector from the first set of vectors. Some examples can include determining whether the second component is restricted based on a bit indicating that the first component is restricted, for instance. In some examples, the first component can be utilized to restrict precoders selectable from a codebook in the first group of codebooks based on the first component. In an aspect, as described above, the first component may be a length $N_1N_2O_1O_2$ bitmap $a_0a_1 \ldots a_{N_1N_2O_1O_2-1}$ where each bit constitutes an $(l_1,m)$ value indicating, at least in part, a first two-dimensional restriction vector $v_{l_1,m}$.

In addition, the methods of any of FIGS. 7A, 7B, 7C, 7D, and 7E can involve selecting a precoder from the precoders selectable from the codebook in the second group of codebooks. In a further aspect, the methods can include generating a CSI report indicating the selected precoder, and optionally also transmitting the CSI report to network node.

Furthermore, some implementations can include determining whether the second component is restricted based on a plurality of bits indicating whether the first component is restricted for at least one of (or for each of) $v_{2l+1,m}$, $v_{2l-1,m}$, and $v_{2l,m}$. In some examples, the first component has an associated index $l_1$ and the second component has an associated index $l_2$, and $l_1$ and $l_2$ have a relation r such that $l_1=rl_2$. In these instances, the method can also include monitoring a size $\Delta_1+\Delta_2+1$ window around any restricted first component with $l_1=rl_2$ that impacts the restriction of its related second components. In some implementations, $\Delta_1=\Delta_2$ and the window size is three.

In a further example feature, the first group of codebooks can include rank 1, rank 2, rank 5, rank 6, rank 7, and/or rank 8 codebooks, and/or the second group of codebooks can include rank 3 and/or rank 4 codebooks.

Turning to the network node methods in FIG. 8A, the figure illustrates a method 400 performed by a network node 106 for codebook subset restriction, which includes generating 402 codebook subset restriction CBSR signaling that indicates a first component 128 common to precoders 124 in a first group of codebooks 118, where the first component 128 maps to a second component 130 common to precoders 126 in a second group of codebooks 120. Furthermore, the CBSR signaling is configured to cause a UE 102 to restrict precoders 126 selectable from a codebook 121 in the second group of codebooks 120 based on the second component 130. In addition, at block 404, method 400 includes transmitting the CBSR signaling to the UE.

FIG. 8B presents another network node 106 method 406 that includes determining a first component 128 that is common to precoders 124 in a first group of codebooks 118 at block 408. Again, the first component 128 maps to a second component 130 that is different than the first component 128 and is common to precoders 126 in a second group of codebooks 120. At block 410, the method 406 includes generating CBSR signaling that restricts precoders 126 selectable from a codebook 121 in the second group of codebooks 120 based on the second component 130. This includes the network node 106 generating the CBSR signaling to indicate the first component 128 that maps to the second component 130. Then, at block 412, method 406 can include transmitting the CBSR signaling at block 412.

In another example method 414 for codebook selection restriction at network node 106 presented in FIG. 8C, the network node 106 can generate, at block 416, codebook subset restriction CBSR signaling. In an aspect, the CBSR signaling indicates a first component 128 for codebook restriction of a first group of codebooks 118 and a second component 130 for codebook restriction of a second group of codebooks 120. Furthermore, the CBSR signaling causes the UE 102 to restrict precoders selectable from a codebook 119 in the first group of codebooks 118 based on the first component 128 and to restrict precoders 126 selectable from a codebook 121 in the second group of codebooks 120 based on the second component 130. In addition, at block 418, the network node 106 transmits the CBSR signaling to the UE 102.

Further aspects not explicitly shown in one or more of FIGS. 8A, 8B, and 8E may also be realized by the UE 102 in further embodiments, including those that include the following features. For example, in some embodiments of these methods, the first component is a vector from a first set of vectors, and the precoders in the first group of codebooks include one or more vectors from the first set of vectors. In some examples, the second component is a vector from a second set of vectors, where the precoders in the second group of codebooks include one or more vectors from the second set of vectors. In some instances, the second component constitutes a vector of a different size than that of the first component, such as where vectors in the second set of vectors are half the size of the vectors in the first set of vectors. Furthermore, some embodiments can include the network node receiving 106, from the UE 102, CSI report indicating permitted codebook subsets corresponding to restricted codebook subsets. In an aspect of some example embodiments, as described above, the first component may be a length $N_1N_2O_1O_2$ bitmap $a_0a_1 \ldots a_{N_1N_2O_1O_2-1}$ where each bit constitutes an $(l_1,m)$ value indicating, at least in part, a first two-dimensional restriction vector $v_{l_1,m}$.

Figure 9B:
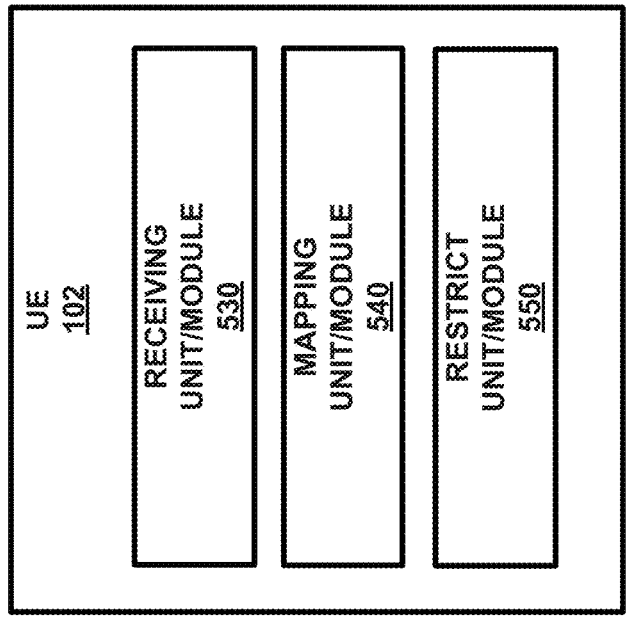
FIGS. 9A and 9B illustrate aspects of a UE in example embodiments of the present disclosure.
Figure 9A:
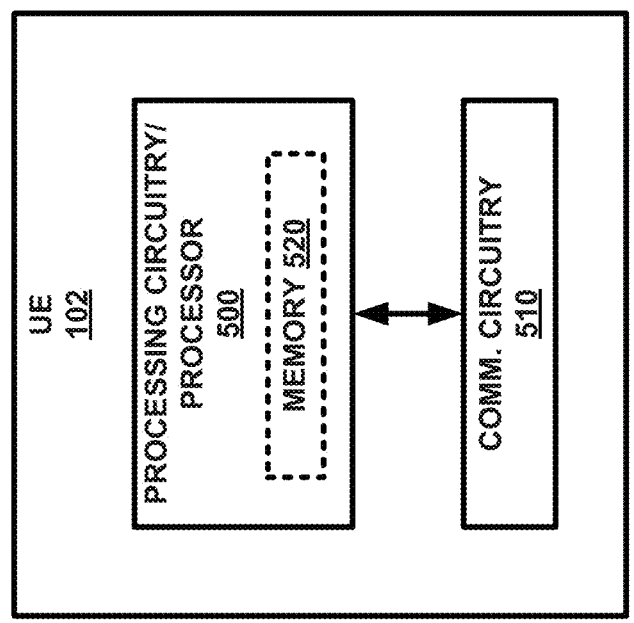

FIG. 9A illustrates additional details of an example UE 102 of a wireless communication system 100 according to one or more embodiments. The UE 102 is configured, e.g., via functional means or units (also may be referred to as modules or components herein), to implement processing to perform certain aspects described above in reference to at least methods presented in FIGS. 7A, 7B, 7C, 7D, and 7E. As shown in FIG. 9B, the UE 102 in some embodiments for example includes means, modules, components, or units 530, 540, and 550 (among other possible means, modules, components, or units not shown explicitly in FIG. 5B) for performing aspects of these methods. In some examples, these means, modules, components, or units can be realized in processing circuitry 500. Specifically, the functional means or units of the UE 102 may include a receiving unit/module 530 configured to receive one or more wireless communications from a network node, such as CBSR signaling in blocks 302, 308, 314, 322, and 330 of FIGS. 7A, 7B, 7C, 7D, and 7E. In addition, the UE can include a mapping unit/module 540 to perform mapping of a first component (and/or restriction thereof) to a second component as described above and performed, for example, blocks 316 and 324 of FIGS. 7 and 7D, above. In addition, UE 102 may include a restrict unit/module for restricting precoders selectable from a codebook as a result of the mapping, for instance in block 332.

In at least some embodiments, the UE 102 comprises one or more processing circuitry/circuits 500 configured to implement processing of the methods presented in FIGS. 7A, 7B, 7C, 7D, and 7E and certain associated processing of the features described in relation to other figures, such as by implementing functional means or units above. In one embodiment, for example, the processing circuit(s) 500 implements functional means or units as respective circuits. The circuits in this regard may comprise circuits dedicated to performing certain functional processing and/or one or more microprocessors in conjunction with memory 520. In embodiments that employ memory 520, which may comprise one or several types of memory such as read-only memory (ROM), random-access memory, cache memory, flash memory devices, optical storage devices, etc., the memory 520 stores program code that, when executed by the one or more for carrying out one or more microprocessors, carries out the techniques described herein.

In one or more embodiments, the UE 102 also comprises communication circuitry 510. The communication circuitry 510 includes various components (e.g., antennas) for sending and receiving data and control signals. More particularly, the circuitry 510 includes a transmitter that is configured to use known signal processing techniques, typically according to one or more standards, and is configured to condition a signal for transmission (e.g., over the air via one or more antennas). Similarly, the communication circuitry includes a receiver that is configured to convert signals received (e.g., via the antenna(s)) into digital samples for processing by the one or more processing circuits.

Figure 10B:
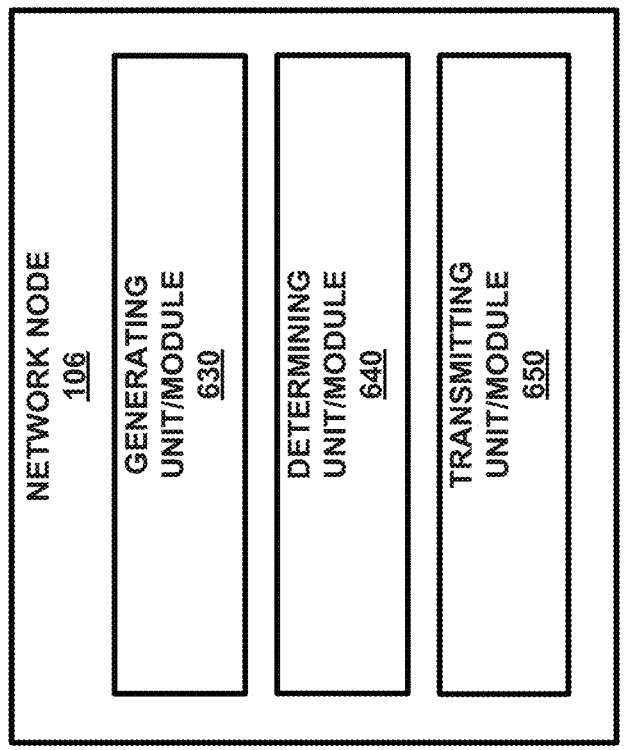
FIGS. 10A and 10B illustrate aspects of a network node in example embodiments of the present disclosure.
Figure 10A:
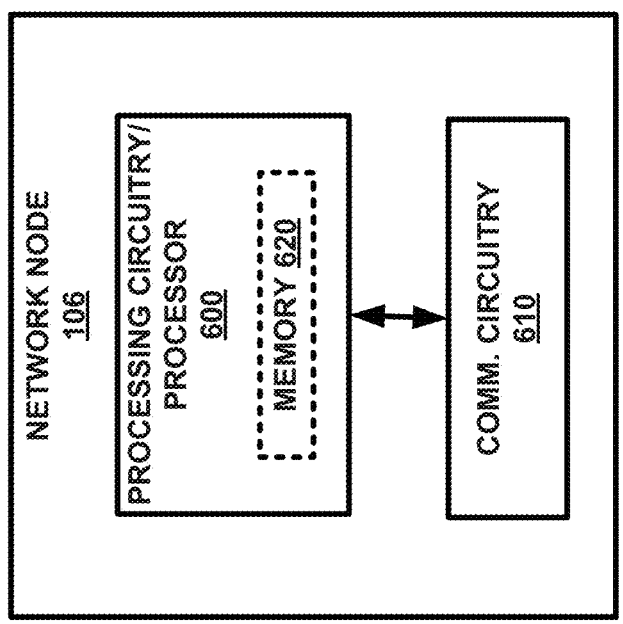

FIG. 10A illustrates additional details of an example network node 106 of a wireless communication system 10 according to one or more embodiments. As shown in FIG. 10B, the network node 106 is configured, e.g., via functional means, components, modules, or units to implement processing to perform certain aspects described above in reference to at least methods presented in FIGS. 8A, 8B, and 8C. In some examples, these means, modules, components, or units may be realized via processing circuitry 600 of FIG. 10A.

In at least some embodiments, the network node 106 comprises one or more processing circuits 600 configured to implement processing of the methods of FIGS. 8A, 8B, and 8C, such as by implementing functional means or units above. In one embodiment, for example, the one or more processing circuits (or processing circuitry) 600 implements functional means or units as respective circuits. The circuits in this regard may comprise circuits dedicated to performing certain functional processing and/or one or more microprocessors in conjunction with memory 1020. In embodiments that employ memory 1020, which may comprise one or several types of memory such as read-only memory (ROM), random-access memory, cache memory, flash memory devices, optical storage devices, etc., the memory 1020 stores program code that, when executed by the one or more for carrying out one or more microprocessors, carries out the techniques described herein.

In one or more embodiments, the network node 106 also comprises communication circuitry 601. The communication circuitry 601 includes various components (e.g., antennas) for sending and receiving data and control signals. More particularly, the circuitry 601 includes a transmitter that is configured to use known signal processing techniques, typically according to one or more standards, and is configured to condition a signal for transmission (e.g., over the air via one or more antennas). Similarly, the communication circuitry includes a receiver that is configured to convert signals received (e.g., via the antenna(s)) into digital samples for processing by the one or more processing circuits.

Those skilled in the art will also appreciate that embodiments herein further include corresponding computer programs. A computer program comprises instructions which, when executed on at least one processor of the network node 106 or UE 102, cause these devices to carry out any of the respective processing described above. Furthermore, the processing or functionality of network node 106 or UE 102 may be considered as being performed by a single instance or device or may be divided across a plurality of instances of network node 106 or UE 102 that may be present in a given system such that together the device instances perform all disclosed functionality.

In an aspect, the user equipment 102 may correspond to any mobile (or even stationary) device that is configured to receive/consume user data from a network-side infrastructure, including laptops, phones, tablets, IoT devices, etc. The network node 106 may be any network device, such as a base station, eNB, gNB, access point, or any other similar device.

Embodiments further include a carrier containing such a computer program. This carrier may comprise one of an electronic signal, optical signal, radio signal, or computer readable storage medium. A computer program in this regard may comprise one or more code modules corresponding to the means or units described above.

The present embodiments may, of course, be carried out in other ways than those specifically set forth herein without departing from essential characteristics of the disclosed subject matter. The present embodiments are to be considered in all respects as illustrative and not restrictive, and all changes coming within the meaning and equivalency range of the appended claims are intended to be embraced therein. Below is a set of exemplary enumerated embodiments of what has been described herein.

Enumerated Embodiments

1. A method for codebook subset restriction at a user equipment (UE), comprising:

receiving from a network node codebook subset restriction signaling (CBSR) that indicates a first component common to precoders in a first group of codebooks;

mapping the first component to a second component that is different than the first component and that is common to precoders in a second group of codebooks; and restricting precoders selectable from a codebook in the second group of codebooks based on the second component.

2. The method of embodiment 1, further comprising restricting precoders selectable from a codebook in the first group of codebooks based on the first component.

3. The method of either of embodiment 1 or 2, wherein the first component comprises a length $N_1N_2O_1O_2$ bitmap $a_0a_1 \ldots a_{N_1N_2O_1O_2-1}$ where each bit constitutes an $(l_1, m)$ value indicating, at least in part, a first two-dimensional restriction vector $v_{l_1,m}$.

4. The method of embodiment 3, wherein mapping the first component to the second component comprises forming a second two-dimensional vector $\tilde{v}_{l_2,m}$ of a different size than that of $v_{l_1,m}$.

5. The method of embodiment 4, wherein $\tilde{v}_{l_2,m}$ is half the size of $v_{l_1,m}$.

6. The method of any of the previous embodiments, further comprising:

selecting a precoder from the restricted precoders selectable from the codebook in the second group of codebooks;

generating a channel state information (CSI) report indicating the selected precoder; and transmitting the CSI report to the network node.

7. A method for codebook selection restriction at a user equipment (UE), comprising:

receiving codebook subset restriction signaling (CBSR) from a network node, the CBSR indicating a first component for codebook restriction of a first group of codebooks, the first component being common to precoders of the first group of precoders, and the CBSR indicating a second component for codebook restriction of a second group of codebooks, the second component being common to precoders of the second group of precoders, the second component being different than the first component; and restricting precoders selectable from a codebook in the first group of codebooks based on the first component and restricting precoders selectable from a codebook in the second group of codebooks based on the second component.

8. The method of embodiment 7, wherein the first component comprises a first bitmap of length $N_1N_2O_1O_2$ having values of $a_0a_1 \ldots a_{N_1N_2O_1O_2-1}$, where each bit of the first bitmap is mapped to an $(l_1,m)$ value which in turn indicates the restriction of the first component $v_{l_1,m}$, and wherein the second component comprises a second bitmap of length $(N_1/2)N_2O_1O_2$ having values of $b_0b_1 \ldots b_{(N_1/2)N_2O_1O_2-1}$ where each bit of the second bitmap is mapped to an $(l_2,m)$ value which in turn indicates the restriction of the second component $v_{l_2,m}$.

9. The method of either of embodiments 7 or 8, further comprising:

selecting a precoder from the restricted precoders selectable from the codebook in the second group of codebooks;

generating a channel state information (CSI) report indicating the selected precoder; and transmitting the CSI report to the network node.

10. A method performed by a user equipment (UE) for identifying combinations used in CSI reporting, the method comprising:

receiving a joint indication of a combination of a rank value and at least one of a first index and a second index, wherein the first index at least identifies a first complex number that scales a two-dimensional (2D) Discrete Fourier Transform (DFT) beam, the second index at least identifies a second complex number that also scales the 2D DFT beam; and determining a number of states that the at least one of the first index and second index can attain according to the rank value and at least one of a codebook configuration and a number of channel state information (CSI) reference signal ports.

11. A user equipment (UE) in a wireless communication network, the UE comprising at least a processor and a memory, the memory containing instructions executable by the processor to perform the aspects of any of embodiments 1-10.

12. A user equipment (UE) in a wireless communication network, the UE configured to perform the aspects of any of embodiments 1-10.

13. A computer program comprising instructions which, when executed by at least one processor of a user equipment, causes the user equipment to perform the aspects of any of embodiments 1-10.

14. A carrier containing the computer program of embodiment 13, wherein the carrier is one of an electric signal, optical signal, radio signal, or computer readable storage medium.

15. A method performed by a network node for codebook subset restriction, comprising:
generating codebook subset restriction signaling (CBSR) that indicates a first component common to precoders in a first group of codebooks, the CBSR configured to cause a user equipment (UE) to map the first component to a second component that is different than the first component and that is common to precoders in a second group of codebooks, and to restrict precoders selectable from a codebook in the second group of codebooks based on the second component; and
transmitting the CBSR to the UE.

16. The method of embodiment 15, wherein the CBSR is further configured to cause the UE to restrict the precoders selectable from a codebook in the first group of codebooks based on the first component.

17. The method of either of embodiment 15 or 16, wherein the first component comprises a length $N_1 N_2 O_1 O_2$ bitmap $a_0 a_1 \ldots a_{N_1 N_2 O_1 O_2 - 1}$ where each bit constitutes an $(l_1,m)$ value indicating, at least in part, a first two-dimensional restriction vector $v_{l_1,m}$.

18. The method of embodiment 17, wherein causing the UE to map the first component to the second component comprises causing the UE to form a second two-dimensional vector $\tilde{v}_{l_2,m}$ of a different size than that of $v_{l_1,m}$.

19. The method of embodiment 18, wherein $\tilde{v}_{l_2,m}$ is half the size of $v_{l_1,m}$.

20. A method for codebook selection restriction at network node, comprising:
generating codebook subset restriction signaling (CBSR), the CBSR indicating a first component for codebook restriction of a first group of codebooks, the first component being common to precoders of the first group of precoders, and the CBSR indicating a second component for codebook restriction of a second group of codebooks, the second component being common to precoders of the second group of precoders, the second component being different than the first component, the CBSR causing a user equipment (UE) to restrict precoders selectable from a codebook in the first group of codebooks based on the first component and to restrict precoders selectable from a codebook in the second group of codebooks based on the second component; and
transmitting the CBSR to the UE.

21. The method of embodiment 20, wherein the first component comprises a first bitmap of length $N_1 N_2 O_1 O_2$ having values of $a_0 a_1 \ldots a_{N_1 N_2 O_1 O_2 - 1}$, where each bit of the first bitmap is mapped by the UE to an $(l_1, m)$ value which in turn indicates the restriction of the first component $v_{l_1,m}$;

and wherein the second component comprises a second bitmap of length $(N_1/2)N_2 O_1 O_2$ having values of $b_0 b_1 \ldots b_{(N_1/2) O_1 O_2 - 1}$ where each bit of the second bitmap is mapped by the UE to an $(l_2,m)$ value which in turn indicates the restriction of the second component $v_{l_2,m}$.

22. The method of either of embodiments 20 or 21, further comprising receiving a channel state information (CSI) report indicating permitted codebook subsets corresponding to the restricted codebook subsets from the UE.

23. A method performed by a network node, comprising:
generating a joint indication of combinations of a rank value and at least one of a first index and a second index, wherein the first index at least identifies a first complex number that scales a two-dimensional (2D) Discrete Fourier Transform (DFT) beam, the second index at least identifies a second complex number that also scales the 2D DFT beam, the joint combination causing a user equipment (UE) to determine a number of states that the at least one of the first index and second index can attain according to the rank value and at least one of a codebook configuration and a number of channel state information (CSI) reference signal ports;
transmitting the joint indication to the UE.

24. A network node in a wireless communication network, the network node comprising at least a processor and a memory, the memory containing instructions executable by the processor to perform the aspects of any of embodiments 15-23.

25. A network node in a wireless communication network, the network node configured to perform the aspects of any of embodiments 15-23.

26. A computer program comprising instructions which, when executed by at least one processor of a network node, causes the network node to perform the aspects of any of embodiments 15-23.

27. A carrier containing the computer program of embodiment 26, wherein the carrier is one of an electric signal, optical signal, radio signal, or computer readable storage medium.

28. A method performed by a network node for codebook subset restriction, comprising:
determining a first component that is common to precoders in a first group of codebooks, wherein the first component maps to a second component that is different than the first component and that is common to precoders in a second group of codebooks;
generating codebook subset restriction signaling (CBSR) that restricts precoders selectable from a codebook in the second group based on the second component, by generating the CBSR to indicate the first component that maps to the second component; and
transmitting the CBSR.

29. A network node in a wireless communication network, the network node comprising at least a processor and a memory, the memory containing instructions executable by the processor to perform the aspects of embodiment 28.

30. A network node in a wireless communication network, the network node configured to perform the aspects of embodiment 28.

31. A computer program comprising instructions which, when executed by at least one processor of a network node, causes the network node to perform the aspects of embodiment 28.

32. A carrier containing the computer program of embodiment 26, wherein the carrier is one of an electric signal, optical signal, radio signal, or computer readable storage medium.

The invention claimed is:

1. A method for codebook subset restriction at a user equipment (UE), the method comprising:
  receiving, from a network node, codebook subset restriction (CBSR) signaling for a first component common to precoders in a first group of codebooks;
  wherein a restriction of the first component maps to a restriction of a second component;
  wherein the second component is common to precoders in a second group of codebooks;
  restricting precoders selectable from a codebook in the second group of codebooks based on the second component; and
  transmitting feedback to the network node responsive to the restricted precoders selectable from the codebook in the second group of codebooks.

2. The method of claim 1, wherein the first component is a vector from a first set of vectors, and wherein the precoders in the first group of codebooks comprise one or more vectors from the first set of vectors.

3. The method of claim 2, wherein the second component is a vector from a second set of vectors, and wherein the precoders in the second group of codebooks comprise one or more vectors from the second set of vectors.

4. The method of claim 3, wherein the second component comprises a vector of a different size than that of the first component.

5. The method of claim 3, wherein the vectors in the second set of vectors are half the size of the vectors in the first set of vectors.

6. The method of claim 1, wherein the CBSR signaling comprises a bitmap comprising a plurality of bits, wherein each bit of the plurality of bits indicates a vector from a first set of vectors.

7. The method of claim 6, further comprising determining whether the second component is restricted based on the bitmap indicating that the first component is restricted.

8. The method of claim 1, further comprising restricting precoders selectable from a codebook in the first group of codebooks based on the first component.

9. The method of claim 1, further comprising:
  selecting a precoder from the precoders selectable from the codebook in the second group of codebooks; and
  generating a channel state information (CSI) report indicating the selected precoder;
  wherein transmitting the feedback comprises transmitting the CSI report to the network node.

10. The method of claim 1, wherein the second component has an index l, and the method further comprising determining whether the second component is restricted based on a plurality of bits indicating whether the first component is restricted for at least one vector in a first set of vectors with indices 2l+1, 2l−1, and 2l.

11. The method of claim 1, further comprising determining whether the second component is restricted based on a plurality of bits indicating whether the first component is restricted for each vector in a first set of vectors with indices 2l+1, 2l−1, and 2l.

12. The method of claim 1, wherein the first component has an associated index $l_1$ and the second component has an associated index $l_2$, and wherein the second component with index $l_2$ is restricted where the first component with index $l_1$ in a window $[2l_2-\Delta_1, 2l_2+\Delta_2]$ is restricted.

13. The method of claim 12, wherein $\Delta_1=\Delta_2$.

14. The method of claim 12, wherein $\Delta_1=\Delta_2=1$, and the window size is three.

15. The method of claim 1, wherein the first group of codebooks comprises rank 1, rank 2, rank 5, rank 6, rank 7, and/or rank 8 codebooks.

16. The method of claim 1, wherein the second group of codebooks comprises rank 3 and/or rank 4 codebooks.

17. A method performed by a network node for codebook subset restriction, comprising:
  generating codebook subset restriction (CBSR) signaling that indicates a first component common to precoders in a first group of codebooks, the first component mapping to a second component common to precoders in a second group of codebooks, the CBSR signaling configured to cause a user equipment (UE) to restrict precoders selectable from a codebook in the second group of codebooks based on the second component;
  transmitting the CBSR signaling to the UE; and
  receiving feedback from the UE, said feedback generated by the UE responsive to the restricted precoders selectable from the codebook in the second group of codebooks.

18. The method of claim 17, wherein the first component is a vector from a first set of vectors, and wherein the precoders in the first group of codebooks comprise one or more vectors from the first set of vectors.

19. The method of claim 18, wherein the second component is a vector from a second set of vectors, and wherein the precoders in the second group of codebooks comprise one or more vectors from the second set of vectors.

20. The method of claim 19, wherein the second component comprises a vector of a different size than that of the first component.

21. The method of claim 20, wherein the vectors in the second set of vectors are half the size of the vectors in the first set of vectors.

22. The method of claim 17, wherein the CBSR signaling is configured to cause the UE to restrict precoders selectable from a codebook in the first group of codebooks based on the first component.

23. The method of claim 17, wherein receiving the feedback comprises receiving, from the UE, a channel state information (CSI) report indicating permitted codebook subsets corresponding to restricted codebook subsets.

24. A user equipment (UE) in a wireless communication network, the UE comprising at least a processor and a memory, wherein the memory contains instructions, that when executed by the processor, causes the UE to:
  receive, from a network node, codebook subset restriction (CBSR) signaling for a first component common to precoders in a first group of codebooks, wherein a restriction of the first component maps to a restriction of a second component, and wherein the second component is common to precoders in a second group of codebooks;
  restrict precoders selectable from a codebook in the second group of codebooks based on the second component: and
  transmit feedback to the network node responsive to the restricted precoders selectable from the codebook in the second group of codebooks.

25. A network node in a wireless communication network, the network node comprising at least a processor and a memory, the memory containing instructions executable by the processor to:
  generate codebook subset restriction (CBSR) signaling that indicates a first component common to precoders in a first group of codebooks, the first component mapping to a second component common to precoders in a second group of codebooks, the CBSR signaling configured to cause a user equipment (UE) to restrict precoders selectable from a codebook in the second group of codebooks based on the second component;

transmit the CBSR signaling to the UE; and receive feedback from the UE, said feedback generated by the UE responsive to the restricted precoders selectable from the codebook in the second group of —codebooks.

* * * * *

UNITED STATES PATENT AND TRADEMARK OFFICE
CERTIFICATE OF CORRECTION

PATENT NO. : 10,972,162 B2
APPLICATION NO. : 16/789759
DATED : April 6, 2021
INVENTOR(S) : Faxér et al.

It is certified that error appears in the above-identified patent and that said Letters Patent is hereby corrected as shown below:

In the Specification

In Column 1, Line 8, delete "2019," and insert -- 2019, now U.S. Pat. No. 10,608,715, --, therefor.

In Column 1, Line 10, delete "U.S. patent Ser. No. 10/411,773," and insert -- U.S. Pat. No. 10,411,773, --, therefor.

In Column 3, Line 21, delete "vectors 10" and insert -- vector S 10 --, therefor.

In Column 3, Line 21, delete "NTxr" and insert -- $N_T xr$ --, therefor.

In Column 3, Line 29, delete "vector s 10" and insert -- vector S 10 --, therefor.

In Column 4, Lines 62-63, delete "$N_h$, $N_v$, and $N_p$" and insert -- $N_h$, $N_v$ and $N_p$ --, therefor.

In Column 5, Line 10, delete "k=0, 1, . . . QN-1" and insert -- k=0, 1, . . . , QN-1 --, therefor.

In Column 6, Line 2, delete "As show," and insert -- As shown, --, therefor.

In Column 6, Line 5, delete "gNB 18B." and insert -- gNB 14B. --, therefor.

In Column 9, Line 33, delete "size-$N_1N_2$ 2 D DFT" and insert -- size-$N_1N_2$ 2D DFT --, therefor.

In Column 11, Line 19, delete "$e^{j2\pi\ sin\ (\phi)d_\lambda n}$," and insert -- $e^{j2\pi sin(\phi)d_\lambda n}$ --, therefor.

In Column 11, Line 23, delete "$e^{j2\pi\ sin\ (\phi)d_\lambda n}$" and insert -- $e^{j2\pi sin(\phi)d_\lambda n}$ --, therefor.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*

In Column 11, Line 64, delete "l$_2$=⌊l$_1$/2⌋" and insert -- $l_2 = \lceil l_1/2 \rceil$ --, therefor.

In Column 12, Line 40, delete "V$_{l,m}$," and insert -- $V_{l_1,m}$, --, therefor.

In Column 13, Line 34, delete "φ$_N$." and insert -- φ$_n$. --, therefor.

In Column 13, Line 38, delete "factor, g(•)" and insert -- factor, g(•), --, therefor.

In Column 13, Line 56, delete "cophasing parameter φ$_N$." and insert -- cophasing parameter φ$_n$. --, therefor.

In Column 13, Line 60, delete "cophasing parameter φ$_N$." and insert -- cophasing parameter φ$_n$. --, therefor.

In Column 18, Line 67, delete "memory 1020." and insert -- memory 620. --, therefor.

In Column 19, Line 1, delete "memory 1020," and insert -- memory 620, --, therefor.

In Column 19, Line 4, delete "memory 1020" and insert -- memory 620 --, therefor.

In Column 19, Lines 9-10, delete "communication circuitry 601. The communication circuitry 601" and insert -- communication circuitry 610. The communication circuitry 610 --, therefor.

In Column 19, Line 12, delete "the circuitry 601" and insert -- the communication circuitry 610 --, therefor.

In Column 19, Lines 60-61, delete "codebook subset restriction signaling (CBSR)" and insert -- codebook subset restriction (CBSR) signaling --, therefor.

In Column 20, Line 6, delete "(l$_1$, m)" and insert -- (l$_1$,m) --, therefor.

In Column 20, Line 25, delete "codebook subset restriction signaling (CBSR)" and insert -- codebook subset restriction (CBSR) signaling --, therefor.

In Column 21, Line 22, delete "codebook subset restriction signaling (CBSR)" and insert -- codebook subset restriction (CBSR) signaling --, therefor.

In Column 21, Line 49, delete "codebook subset restriction signaling (CBSR)," and insert -- codebook subset restriction (CBSR) signaling, --, therefor.

In Column 21, Line 66, delete "(l$_1$, m)" and insert -- (l$_1$,m) --, therefor.

In Column 22, Lines 1-2, delete "$b_0 b_1 \cdots b_{(N_1/2)O_1 O_2-1}$--" and insert

CERTIFICATE OF CORRECTION (continued)
U.S. Pat. No. 10,972,162 B2

-- $b_0 b_1 \ldots b_{(N_1/2)N_2 O_1 O_2 - 1}$ --, therefor.

In Column 22, Line 47, delete "codebook subset restriction signaling (CBSR)" and insert -- codebook subset restriction (CBSR) signaling --, therefor.

In the Claims

In Column 24, Lines 55-56, in Claim 24, delete "component: and" and insert -- component; and --, therefor.

In Column 25, Lines 8-9, in Claim 25, delete "of–codebooks." and insert -- of codebooks. --, therefor.